United States Patent [19]

Bredow et al.

[11] Patent Number: 5,017,632

[45] Date of Patent: May 21, 1991

[54] WATER-BASED COMPOSITES WITH SUPERIOR CURE IN THICK FILMS, AND CHEMICAL AND SHOCK RESISTANCE

[75] Inventors: Charles W. Bredow, Doylestown; Frederick J. Schindler, Fort Washington; Charles E. Warburton, Jr., Ambler, all of Pa.

[73] Assignee: Rohm and Haas Company, Philadelphia, Pa.

[21] Appl. No.: 450,794

[22] Filed: Dec. 14, 1989

[51] Int. Cl.$^5$ .................. C08L 25/10; C08L 35/06; C08L 63/00; C08K 5/54

[52] U.S. Cl. .................. 523/400; 523/406; 523/409; 523/412; 523/413

[58] Field of Search .............. 523/409, 413, 412, 406, 523/400

[56] References Cited

U.S. PATENT DOCUMENTS

| | | | |
|---|---|---|---|
| 3,240,736 | 3/1966 | Beckwith | 521/54 |
| 3,316,187 | 4/1967 | Grosner | 521/135 |
| 3,578,548 | 5/1973 | Wesp | 428/413 |
| 3,822,229 | 7/1974 | McMaster | 523/401 |
| 3,859,239 | 1/1975 | Van Gils | 525/119 |
| 4,049,869 | 9/1977 | De Long | 428/413 |
| 4,222,981 | 9/1980 | Caswell | 525/109 |
| 4,330,446 | 5/1982 | Miyosawa | 523/409 |
| 4,342,843 | 8/1982 | Perlinski | 523/402 |
| 4,367,298 | 1/1983 | Abbey | 427/386 |
| 4,377,433 | 3/1983 | Merz | 523/410 |
| 4,427,804 | 1/1984 | Tortorello | 523/410 |
| 4,485,200 | 11/1984 | Perlinski | 525/119 |
| 4,510,274 | 4/1985 | Okazaki | 523/411 |
| 4,518,653 | 5/1985 | McWilliams | 428/415 |
| 4,522,962 | 6/1985 | Abbey | 523/410 |
| 4,524,107 | 6/1985 | Marchetti | 523/414 |
| 4,532,273 | 7/1985 | Kadowaki | 523/402 |
| 4,588,757 | 5/1986 | Minnis | 523/409 |
| 4,626,567 | 12/1986 | Chang | 523/213 |
| 4,740,536 | 4/1988 | Chao | 523/406 |

FOREIGN PATENT DOCUMENTS

| | | |
|---|---|---|
| 1043486 | 11/1978 | Canada . |
| 0245012 | 11/1987 | European Pat. Off. . |
| 50-111129 | 9/1975 | Japan . |
| 53-096942 | 8/1978 | Japan . |
| 58-007467 | 1/1983 | Japan . |
| 421659 | 3/1972 | U.S.S.R. . |
| 883114 | 11/1981 | U.S.S.R. . |
| 1014879 | 4/1983 | U.S.S.R. . |

*Primary Examiner*—John Kight, III
*Assistant Examiner*—Kathryne E. Shelborne

[57] ABSTRACT

A coating composition is used for coating or overlaying Portland cement concrete or metal. The composition includes a synthetic polymer latex, an amine-functional epoxy curing agent, an epoxy-functional or amine-functional silane, a liquid epoxy resin, and a filler having a fine particle size. The coating composition has superior crack resistance and low cost in comparison with epoxy/amine-type polymer concrete, and excellent strength development, chemical resistance, and rapid cure in thick films in comparison with latex-based cementitious compositions. The coating composition can be mixed from a pair of storage-stable components; a dry mix including the fine particle size filler and the epoxy resin, and optionally larger size aggregate, and a wet mix including the polymer latex, the silane, and the amine curing agent. The two components can be mixed on site to give a fluid coating composition having a long pot life and low viscosity, which rapidly develops strength, and ultimately develops high compressive strength, thermal shock resistance, and resistance to chemical attack, especially attack by aqueous acids.

20 Claims, 3 Drawing Sheets

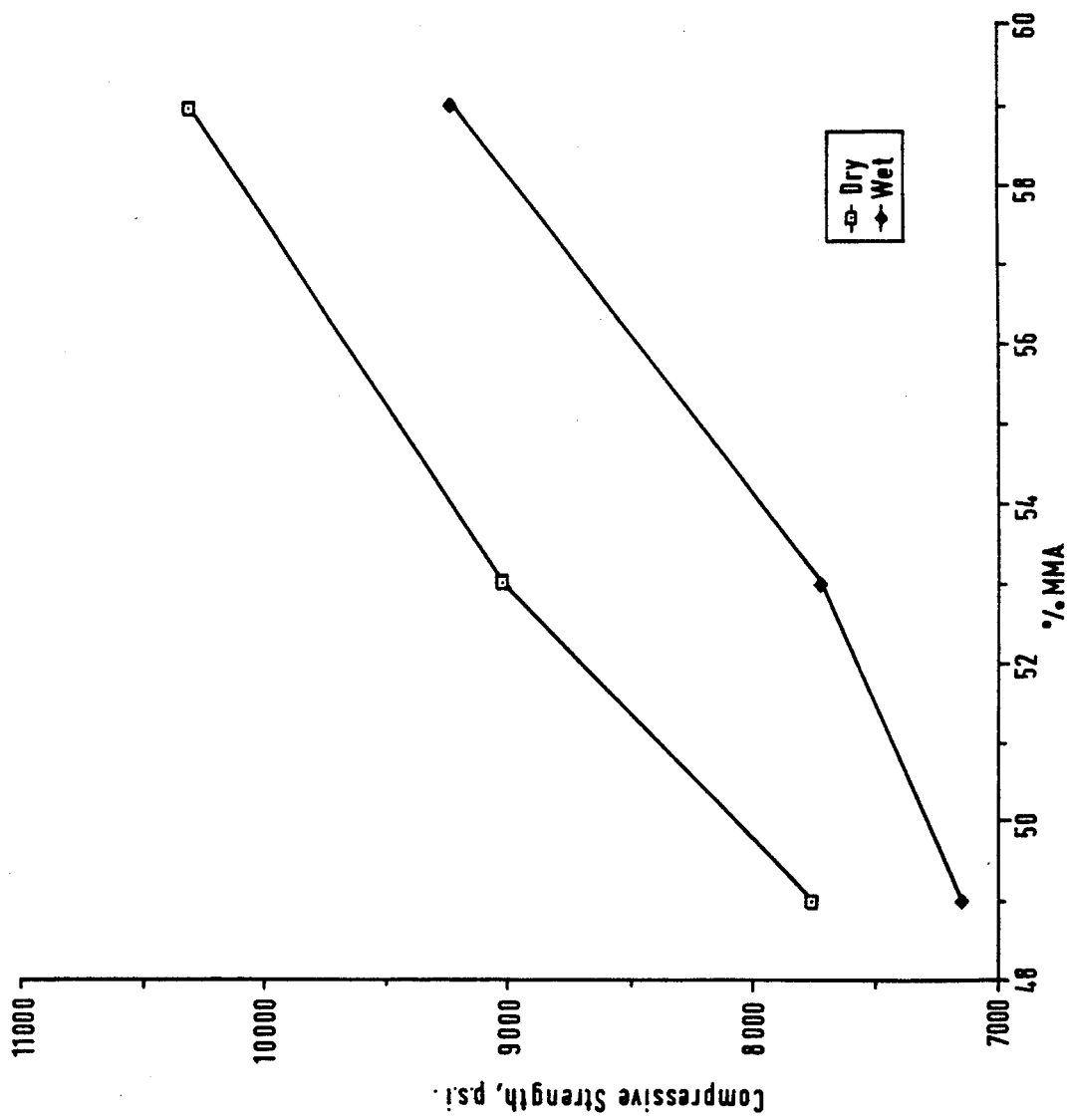

WATER-BASED COMPOSITES WITH SUPERIOR CURE IN THICK FILMS, AND CHEMICAL AND SHOCK RESISTANCE

BACKGROUND OF THE INVENTION

1. Field of the Invention

This invention relates generally to protective coatings and overlays for Portland cement concrete, and more specifically to water-based, polymer-modified compositions for coatings and mortar mixes.

2. Brief Description of the Prior Art

Portland cement concrete is widely used in modern construction, being used in a multitude of applications, ranging from forming walls and floors to casting water and sewer pipes and erecting storage tanks. Although it has high compressive strength, and is relatively inexpensive and durable, Portland cement concrete does have a number of disadvantages in various applications. For example, it has poor colorability and tends to effloresce, and has poor resistance to aqueous acids. These properties, in particular the poor aqueous acid resistance, make it desirable to protect Portland cement concrete with a chemically resistant coating or overlay in many applications.

Thick coatings (often referred to as a "topping," "lining," or "overlay" when greater than about 0.25 cm thick) are preferred for long term resistance to chemicals, in applications where significant abrasion is encountered, or where coarse aggregate must be added to provide slip resistance.

Two classes of compositions are in use for forming protective coatings for Portland cement concrete. The first class consists of "polymer concrete" compositions which include reactive organic liquid materials which solidify under cure conditions. The second class is formed of polymer-modified hydraulic cements. Conventional solvent-based organic coating compositions tend not to be used because solvent is retained in thick films, resulting in long cure times and long-term solvent release. Hydraulic cements without polymer modifiers are not useful because they tend to show poor adhesion and chemical resistance, and lack strength.

Polymer concrete compositions typically comprise about 13 percent by weight organic material when formulated for use at about 0.636 cm thickness, and are typically formulated using a binder made up of an epoxy resin and an amine curing agent for the epoxy. While this type of binder can provide reasonable cure and chemical resistance at low cost, cracking and delamination are recognized as problems with epoxy/amine polymer concrete overlays, in particular outdoors. Ultraviolet degradation of epoxy/amine polymer concrete is also recognized as a problem. Even for indoor applications, cracking and delamination can be encountered where the overlays are exposed to changes in temperature such as in food or beverage plants, or pharmaceutical plants, where steam or hot water is used to clean floors.

Polymer-modified hydraulic cements typically employ a lower level of organic materials than polymer concrete, resulting in a coefficient of thermal expansion similar to the Portland cement concrete, and lower materials costs. While polymer-modified hydraulic cements tend to give good resistance to cracking and delamination, their chemical resistance tends to be poorer than There is a need for a coating composition for Portland cement concrete which has a relatively low cost, good resistance to cracking and delamination, and good resistance to chemicals, in particular good resistance to aqueous acids.

In addition to relatively high costs, polymer concrete compositions may have a number of other drawbacks such as unacceptable volatility, flammability and toxicity. They may require special equipment to achieve cure, and may require on-site mixing of multiple components, and concomitantly, multiple packages for shipment.

There is a need for a coating composition for Portland cement concrete which requires a minimum of components to be separately packaged and shipped, and mixed together at the site of application.

Epoxidized polymeric materials have long been used for modifying hydraulic cements including Portland cement. For example, U.S. Pat. No. 3,449,278 discloses improving concrete strength through use of an emulsified epoxy resin and an amine, the epoxy resin including adducts of epoxide with an excess of styrenated amidoamine, providing good water dispersibility. Another polymeric material used for this purpose has been aqueous latex. Combinations of the two have also been known. For example, U.S. Pat. No. 3,240,736 discloses an aqueous binder or mortar comprising 20–85 percent by weight hydraulic cement, 2–25 percent polymer latex as a plasticizer, and 10–50 percent ambient curing resin selected from epoxide, polyurethane, polyester and silicone. Water is added to cure the hydraulic cement; and a curing agent for the resin is used: polyamide for the epoxide resin, an amine for the polyurethane, a peroxide for the polyester, and a low molecular weight polyamide for the silicone. Similar compositions without hydraulic cement are disclosed for similar applications in U.S. Pat. No. 3,316,187, in which phenolic microballoons are substituted for the hydraulic cement of the '736 patent, consisting essentially of 20–85 percent by weight hydraulic cement, 15–50 percent liquid epoxy resin and curing agent, and 2–25 percent of polymeric latex solids. A special plasticizing agent is disclosed, the plasticizing agent including a film-forming copolymer and a carbocyclic compound with two vicinal carboxy groups, such as phthalic acid. The latex can be advantageously dried and packaged with the cement, reducing the number of components and packages required. Soviet patent 883114-A discloses a corrosion-resistant industrial flooring composition including a synthetic rubber latex, an epoxydimethylhydantoin resin, marshalite and an amino-phenol epoxy curing agent.

Combinations of latex polymers and epoxy resins are also known in the adhesive arts. For example, U.S. Pat. No. 4,588,757 discloses a method of synthesizing an emulsion polymer having a glass transition temperature of from about −10° C. to −50° C. in the presence of an epoxy resin. The resulting material is mixed with an aqueous emulsion of an amine-functional resin to give an adhesive for bonding plastic substrates. U.S. Pat. No. 4,510,274 discloses an adhesive composition including an ethylene/vinyl acetate/acid/acrylamide latex polymer, an epoxy resin, and an amine for laminating polyolefin films. U.S. Pat. No. 4,532,273 discloses an adhesive composition for automotive applications. The adhesive includes a latex polymer, an epoxy resin, a tackifier and an amine curing agent, the latex being polymerized from monomer including an adduct of epichlorohydrin and a tertiary amine ester of (meth)acrylic acid. U.S. Pat. No. 3,578,548 discloses the use of an epoxy resin as a transient tackifier for latex-based pressure sensitive adhesives. An adduct of epoxy resin and diethlyenetriamine (DETA) is used to cure the transient tackifier. Soviet patent 421659-A discloses a polymer concrete composition useful as an adhesive for industrial flooring, the composition including 19–34 percent by weight epoxy resin, 1–12 percent liquid latex, 2–10 percent polyethylenepolyamine hardener, 40–70 percent filler, and 7–14 percent tetraethoxy silane. European patent application 0245012 discloses a two-part composition, the first part including an oil-soluble catalyst for carboxyl/epoxy cure and an epoxy emulsion, the second part including a butadiene-styrene latex polymer and a water-soluble amine. When mixed the two parts provide a long-pot life epoxy/carboxylated latex having a quick film cure. Compositions including latex polymer, epoxy resin, and epoxy curing agents other than catalysts for epoxy-carboxyl are disclosed, for example, in U.S. Pat. Nos. 4,524,107, 4,522,962, 4,510,274, 4,427,804, 4,485,200, 4,367,298, 4,342,843, 4,377,433, 4,222,981, and 3,859,239, Soviet patent 1014879-A, Japanese unexamined patent publications (Kokai) 58–007467, 53–096942, and 50–111129, and Canadian patent 1,043,486.

Combinations of latex polymers and epoxies have also been disclosed in other arts. For example, U.S. Pat. No. 4,049,869 discloses a composition including a high-acid acrylic latex (e.g. 14 percent acrylic acid), an ultraviolet absorber, and a crosslinking agent, for use in preserving porous inorganic substrates. The crosslinking agent can be epoxy resin, and polyethyleneimine or melamine resin can be optionally included.

Organosilanes are known for use in treating cementitious surfaces to improve adhesion. U.S. Pat. No. 4,626,567 discloses a water-resistant acrylic latex sealant composition which includes an organoaminosilane, as well as a small amount of silica, such as a fumed silica, which cooperates with the silane to provide enhanced adhesive properties. U.S. Pat. No. 4,518,653 discloses a glass fiber treatment employing a composition including an epoxy resin, polyvinyl pyrrolidone, an emulsifier or dispersible nontacky film-forming polymer, such as a bisphenol polyester resin, and methacryloxyalkytrialkoxy silane.

While some compositions are known to provide specific properties which are desirable for Portland cement concrete overlays, such as long pot life, rapid early strength development, high ultimate strength, good resistance to chemicals and delamination by thermal shock, and two-component packaging and mixing, no single prior composition is know to provide a desirable balance of all these properties. There is a need for a coating or mortar mix composition which can be packaged as a two component system, and subsequently stored and later transported to the site of application, where the two components can be mixed to provide a coating compostion with good pot life, but which rapidly develops strength after application, ultimately providing a coating with good chemical and thermal shock resistance for a Portland cement concrete or metal substrate.

SUMMARY OF THE INVENTION

The present invention advantageously provides a coating composition for use in coating and overlaying Portland cement concrete and metal which has superior crack resistance and low cost in comparison with epoxy/amine-type polymer concrete, and excellent strength development, chemical resistance, and rapid cure in thick films in comparison with latex-based cementitious compositions previously known in the art. Further, the coating composition can be mixed from a pair of storage-stable components which can be separately mixed, stored, and later transported to a remote application site, where they can be mixed with conventional equipment to provide a fluid coating composition having a long pot life and low viscosity, permitting easy and rapid application to the substrate. The coating composition rapidly develops strength, and ultimately develops high compressive strength, thermal shock resistance, and resistance to chemical attack, especially attack by aqueous acids.

The coating composition of the present invention includes:

(a) a synthetic polymer latex;
(b) an amine-functional epoxy curing agent, the epoxy curing agent being soluble or dispersible in water;
(c) a silane selected from the class consisting of epoxy-functional silanes and amine-functional silanes;
(d) á liquid epoxy resin; and
(e) silica having a fine particle size.

Preferably, the weight ratio of polymer latex solids to the sum of the weights of the epoxy resin and epoxy curing agent components is from about 60:40 to 75:25. While not intending to be bound by any theory or explanation of the mechanism of cure of the coating composition of the invention, it is believed that the polymer latex tends to provide a matrix for cure of the epoxy resin with the amine curing agent. The epoxy resin and curing agent are believed to act as a transient reactive coalescent for the polymer latex during drying of the coating composition, permitting the use of a synthetic polymer latex having a higher glass transition temperature than would otherwise be possible. Higher polymer glass transition temperatures are believed to be positively related to increased strength. The cured epoxy resin is believed to form a three dimensional network, in the form of a hard, crosslinked phase, which contributes to the strength of the cured coating composition and limits swelling of the cured coating composition by water or organic solvents. In addition, it is believed that the polymer latex contributes the inherent flexibility of a high molecular weight linear polymer, which is believed to be important in crack resistance after cure.

The synthetic polymer latex provides a high molecular weight polymer at low viscosity. This is desirable in that it permits the coating to include higher levels of small particle size filler than are typical of even low molecular weight epoxy resin/amine curing agent polymer concrete formulations. Small particle size filler, in particular, small particle size silica, provides increased strength in the cured coating composition.

On the other hand, as the synthetic polymer latex is typically prepared as an aqueous dispersion, the water of dispersion can accompany the synthetic polymer latex when the latter is employed in the coating composition, and the volume occupied by this water must be accomodated during drying of the coating composition, either by shinkage of the drying coating composition, or by development of porosity. It is therefor preferred that the coating composition be formulated with the lowest practical level of water and at low viscosity.

The coating composition can be prepared at the site at which it is to be applied from two premixed components, a first "wet" component comprising a curable latex composition, and a second "dry" component. The curable latex composition includes a synthetic polymer latex; an amine-functional epoxy curing agent which is soluble or dispersible in water; and an epoxy-functional or an amine-functional silane. Alternatively, the silane can be incorporated in the dry mix.

Preferably, the synthetic polymer latex comprises a synthetic polymer selected from acrylic polymers, styrene/acrylic copolymers, styrene/butadiene copolymers, chlorinated vinyl polymers, and hydrophobic vinyl acetate copolymers, and can be prepared by an emulsion polymerization technique. The glass transition temperature of the synthetic polymer is preferably from about 0° C. to 30° C. It is preferred that the synthetic polymer latex provide from about 60 to 75 percent by weight of the total organic solids of the composition.

In order that the coating composition be free from an excess of nonionic surfactant, which might otherwise tend to retard strength development by reducing water loss from the surface of the applied coating composition, it is preferred that the polymer latex includes less than about 2 percent by weight of polymer solids of nonionic surfactant.

Suprisingly, it has been found that the liquid epoxy resin can be packaged with the silica filler, and yet give cure characteristics which are as good or better than when emulsified epoxy resin is employed. This fact permits relatively low solids polymer latexes to be used in the other constituent of the coating composition, such as those with solids of only about 50% by weight, while the level of water in the mixed coating composition is selected to be low.

A particularly suprising advantage of the composition of the present invention is the superior rate of strength development in comparison with compositions lacking any of the required components in general, and in particular in comparison with various compositions of the prior art.

BRIEF DESCRIPTION OF THE DRAWINGS

FIG. 3 is a graph of the compressive strength (wet and dry) of cured coating compositions of the present invention as a function of the weight percentage of methyl methacrylate for a series of methyl methacrylate/butyl acrylate copolymer latexes.

DETAILED DESCRIPTION

Figure 1:
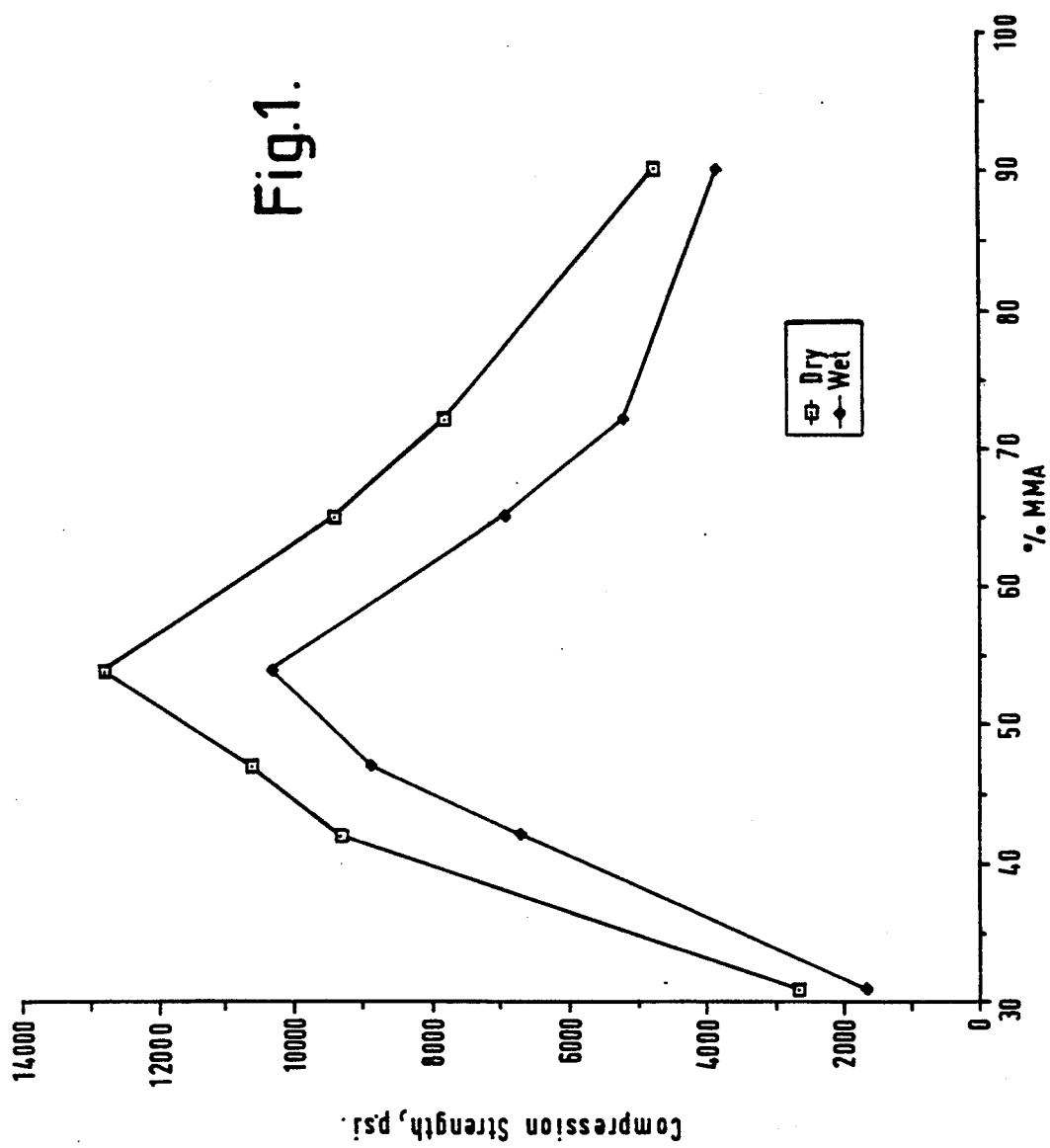
FIG. 1 is a graph of the compressive strength (wet and dry) of cured coating compositions according to the present invention as a function of the weight percentage of methyl methacrylate in the monomer from which the latex polymer in the cured composition was polymerized, showing a maximum at around 55 percent methyl methacrylate.

The coating compositions of the present invention are of the type sometimes referred to as "mortars," "toppings," "overlays," or the like in the art. A general description of such materials and their application and use can be found in P. Maslow, *Chemical Materials For Construction* (Structures Publishing Co., Farmington, Mich. 1974). They are distinguishable from polymer-modified concrete in that they do not include Portland cement or another hydraulic cement as an admixture. In addition, they are distinguishable from "polymer concretes" formed by in-situ bulk polymerization of a vinyl monomer, such as methyl methacrylate.

The coating composition of the present invention includes a synthetic polymer latex. While any type of latex that dries to a strong, water resistant film can be used, preferably, the synthetic polymer latex employed in the coating composition comprises a synthetic polymer latex selected from acrylic polymer latexes, styrene/acrylic copolymer latexes, styrene/butadiene copolymer latexes, chlorinated vinyl polymer latexes, acrylonitrile butadiene copoloymer latexes, and hydrophobic vinyl acetate copolymer latexes.

By "acrylic polymer latex" is meant a polymer latex polymerized from monomers comprising substantially polymerizable monomers including the acryl group ($-COCH=CH_2$) or methacryl ($-COC(CH_3)=CH_2$) group. By "hydrophobic" vinyl acetate copolymer latexes is meant those copolymer latexes of vinyl acetate, such as ethylene/vinyl acetate copolymer latexes, which dry to form water-resistant films, in contrast to films formed by vinyl acetate homopolymer latexes, which tend to be water-sensitive. When the polymer latex is to be packaged with an amine, such as when preparing one component of a two component "system" (the two components to be later mixed on site to provide a coating composition of the present invention), an alkaline-resistant polymer latex is preferred, such as an acrylic, styrene/acrylic, or styrene/butadiene polymer latex. Mixtures of polymer latexes that are compatible on formulation (that is, when mixed) can be used.

The polymer latex used in the present invention can be prepared by any technique known in the art, such as suspension polymerization, interfacial polymerization, or emulsion polymerization. Emulsion polymerization techniques for preparing aqueous dispersions of latex polymer particles from ethylenically unsaturated monomers are well known in the polymer arts, and any conventional emulsion technique can be used, such as single and multiple shot batch processes, and continuous processes. If desired, a monomer mixture can be prepared and added gradually to the polymerization vessel. The monomer composition within the polymerization vessel can be varied during the course of the polymerization, such as by altering the composition of the monomer being fed into the vessel. Both single and multiple stage polymerization techniques can be used. The latex polymer particles can be prepared using a seed polymer emulsion to control the number of particles produced by the emulsion polymerization as is known in the art. The particle size of the latex polymer particles can be controlled by adjusting the initial surfactant charge as is known in the art. The preparation of polymer latexes is discussed generally in D. C. Blackley, *Emulsion Polymerization* (Wiley, New York, 1975).

Aggregation of latex polymer particles is discouraged by including a micelle-forming, stabilizing surfactant in the polymerization mix. In general, the growing latex particles are stablized during emulsion polymerization by one or more surfactants such as an anionic or nonionic surfactant, or a mixture thereof, as is well known in the polymerization art. Many examples of surfactants suitable for emulsion polymerization are given in *McCutchen's Detergents and Emulsifiers* (MC Publishing Co., Glen Rock, N.J.), published annually. Other types of stabilizing agents, such as protective colloids, can also be used.

However, it is desirable to avoid processes which require the addition of a substantial amount of nonionic surfactant, and it is preferred that the resulting polymer latex include less than about two percent by weight of nonionic surfactant or emulsifier. Nonionic surfactants are often added to promote the stability of aqueous dispersions of polymer latexes. However, it has been found that excessive amounts of nonionic surfactant in the coating compositions of the present invention are detrimental to strength development during cure, in that they tend to retard water loss from the surface of the coating. Similarly, it is desirable to avoid the subsequent addition of an excess of nonionic surfactant during preparation of the coating composition or an intermediate thereto.

Examples of polymer latexes which can be employed in the compositions of the present invention include those polymerized from ethylenically unsaturated monomers, such as alpha, beta-ethylenically unsaturated monomers, including styrene, butadiene, alpha-methyl styrene, vinyl toluene, vinyl naphthalene, ethylene, vinyl acetate, vinyl versatate, vinyl chloride, vinylidene chloride, acrylonitrile, methacrylonitrile, (meth)acrylamide, various ($C_1$–$C_{20}$)alkenyl esters of (meth)acrylic acid; for example, methyl (meth)acrylate, ethyl (meth)acrylate, n-butyl (meth)acrylate, isobutyl (meth)acrylate, 2-ethylhexyl (meth)acrylate, cyclohexyl (meth)acrylate, n-octyl (meth)acrylate, n-decyl (meth)acrylate, n-dodecyl (meth)acrylate, tetradecyl (meth)acrylate, n-amyl (meth)acrylate, neopentyl (meth)acrylate, cyclopentyl (meth)acrylate, lauryl (meth)acrylate, oleyl (meth)acrylate, palmityl (meth)acrylate, and stearyl (meth)acrylate; other (meth)acrylates such as isobornyl (meth)acrylate, benzyl (meth)acrylate, phenyl (meth)acrylate, 2-bromoethyl (meth)acrylate, 2-phenylethyl (meth)acrylate, and 1-naphthyl (meth)acrylate; alkoxyalkyl (meth)acrylate such as ethoxyethyl (meth)acrylate; mono- and dialkyl esters of ethylenically unsaturated di- and tricarboxylic acids and anhydrides, such as ethyl maleate, dimethyl fumarate, trimethyl aconitate, and ethyl methyl itaconate. As used in the present specification and claims, "(meth)acrylate" denotes both "acrylate" and "methacrylate."

The ethylenically unsaturated monomer can also include at least one multi-ethylenically unsaturated monomer effective to raise the molecular weight and crosslink the polymer. Examples of multi-ethylenically unsaturated monomers that can be used include allyl (meth)acrylate, tripropyleneglycol di(meth)acrylate, diethyleneglycol di(meth)acrylate, ethyleneglycol di(meth)acrylate, 1,6-hexanediol di(meth)acrylate, 1,3-butyleneglycol (meth)acrylate, polyalkylene glycol di(meth)acrylate, diallyl phthalate, trimethylolpropane tri(meth)acrylate, divinyl benzene, divinyl toluene, trivinyl benzene, and divinyl naphthalene.

Small amounts of other types of copolymerizable monomers can also be included in the monomer mix from which the synthetic polymer latexes used in the present invention can be prepared. For example, small amounts of acid-functional copolymerizable monomer of the type typically included to confer colloidal stability can be used. Examples of acid-functional copolymerizable monomers include acrylic acid, methacrylic acid, itaconic acid, beta-acryloxypropionic acid, and the like. Small amounts of copolymerizable monomers having other types of functionality can also be included, such as adhesion-promoting monomers.

Examples of synthetic polymer latexes which can be used include acrylic copolymer latexes, such as butyl acrylate/methyl methacrylate/acid and ethyl acrylate/methyl methacrylate/acid copolymer latexes; vinyl acetate homopolymer and copolymer latexes, including ethylene/vinyl acetate copolymer latexes, styrene/butadiene copolymer latexes, and the like.

In a presently preferred embodiment of the invention, an acrylic latex copolymer is employed, the copolymer being polymerized from monomer comprising 45.6 percent by weight butyl acrylate, 58.7 percent methyl methacrylate, and 1.3 percent methacrylic acid. The copolymer is prepared by a gradual addition technique with persulfate as thermal initiator, such as disclosed in *Emulsion Polymerization of Acrylic Polymers*, Bulletin, Rohm and Haas Company, Philadelphia, Pa. This polymer latex has a calculated glass transition temperature of 10°–16° C.

In general, polymer latexes which dry to form strong, water-resistant films are preferred. In order to avoid cracking during drying of the coating composition of the invention, the glass transition temperature (Tg) of the synthetic polymer is preferably less than about 30° C., and preferably less than about 25° C. when copolymers of butyl acrylate and methyl methacrylate are used. Synthetic polymers having a glass transition of temperature of greater than about 25° C. and which are more hydrophilic than butyl acrylate/methyl methacrylate copolymers can also be used, where water provides more plasticization during film formation.

In order to maximize the compressive strength of the cured coating composition when used for indoor flooring applications, it is preferred that the glass transition temperature of the polymer latex be greater than about 0° C for coating or overlay compositions intended for such applications. A general description of indoor flooring applications for this type of material is provided in Chapter 2 of P. Maslow, *Chemical Materials For Construction*.

The synthetic polymer latex preferably provides from about 60 to 75 percent by weight of the total organic solids of the coating composition, the remainder being provided by the epoxy resin, amine functional curing agent, et al.

The weight ratio of latex polymer solids to the sum of the epoxy resin and the epoxy curing agent is preferably from about 60:40 to 75:25, and more preferably from about 70:30 to 75:25.

The composition of the present invention includes at least one epoxy resin. Preferably, the epoxy resin is liquid at the temperature at which the coating composition is applied. Epoxy resins which can be used in the coating composition of the present invention include epoxy resins containing an average of greater than one epoxy group. Examples of epoxy resins which can be used include reaction products of epichlorohydrin with bisphenol A or bisphenol F, epoxidized novolac resins formed by reaction of epichlorohydrin with the reaction product of phenol (or substituted phenols) with formaldehyde; reaction products of epichlorohydrin and an aliphatic polyol such as glycerol, 1,4-butanediol, poly(oxypropylene) glycol or similar polyalcohol components. Mixtures of such resins can also be employed. A suitable bisphenol A-type epoxy resin is available from Shell Chemical Co. as Epon ® 828 resin. Mixtures of epoxy resins, including mixtures with reactive epoxy-functional diluents, can also be used.

The epoxy resin can be blended directly with the fine particle size filler to provide a "dry" component for preparing the coating composition of the present invention. The dry component can be separately packaged and stored, and subsequently shipped to the site at which the coating composition is to be applied. The dry component including the epoxy resin can be mixed on site with a "wet" component including the amine-functional epoxy curing agent. The liquid epoxy resin can be blended directly with the fine particle size filler, or the resin can be first emulsified using conventional emulsification processes. In this latter case, it is preferable to select the type and amount of emulsification agent so that the total proportion of nonionic surfactant in the coating composition is less than that which adversely affects the loss of water from the surface of the applied coating composition.

Virtually any polyfunctional amine containing active hydrogen as a primary or secondary substituent can be employed in the coating compositions of the present invention as amine-functional epoxy curing agents. Examples of amine-functional epoxy curing agents include ethylene diamine, diethylamine triamine, triethylene tetramine, polyoxypropylene amines such as Jeffamine® D-230, amine-functional acrylic resins such as disclosed in U.S. Pat. No. 4,120,839, modified aliphatic polyamines such as Ancamine® 1922 and Ancamine 2021, cycloaliphatic Mannich bases such as Ancamine 1732, modified cycloaliphatic polyamines such as Ancamine 1955, trimethyl hexamethylene diamine, isophorone diamine, and tetraethylene pentamine. Mixtures of amine-functional epoxy curing agents can also be used. A presently preferred epoxy curing agent is Jeffamine EDR-148, an oligomeric ethylene oxide diamine. Preferably, the amine-functional epoxy curing agent is selected to provide ample pot life for the mixed coating composition and low viscosity to ease application of the fluid coating composition to the substrate. For adequate pot life and low viscosity, diamine oligomers of ethylene glycol and diamine oligomers of propylene glycol are preferred.

Early strength development is an important and advantageous property of the coating compositions of the present invention. Early strength development is related to the amine-functional epoxy curing agent and the specific polymer latex selected. This property is especially important when industrial or commercial floors are being overlayed or coated with the coating composition of the present invention, as it is desirable to return a floor to service as quickly as possible after an overlay or coating is applied. Being able to return a floor to service within twenty-four hours after application of the coating composition is especially desirable in many cases.

Dry compressive strengths of coating composition vary with time and depend on the amine-functional epoxy curing agent selected. Some amines which produce high early strength give poor pot life, a tendency to cracking during cure, or lower ultimate strength. Diamine oligomers of ethylene glycol are preferred for rapid early strength development in combination with good pot life, resistance to cracking, and good ultimate strength. Early strength development can be accelerated with phenols or tertiary amines, and especially tertiary amines derived from Mannich reactions such as dimethylaminomethylphenols.

The coating composition of the present invention also includes an amine-functional or an epoxy-functional silane. Examples of suitable amine-and epoxy-functional silanes include N-(2-aminoethyl)-3-aminopropyl trimethoxysilane, N-(2-aminoethyl)-3-aminopropyl methyldimethoxysilane, (aminoethylaminomethyl)-phenylethyl trimethoxysilane, 4-aminobutyldimethylmethoxy silane, 4-aminobutyl triethoxysilane, N-2-aminoethyl-3-aminopropyltris(2-ethylhexoxy)silane, p-aminophenyl triethylsilane, 3-aminopropyl dimethylethoxysilane, 3-aminopropyl methyldiethoxysilane, 3-aminopropyl triethoxysilane, 3-aminopropyltrimethoxy silane, diethylenetriaminepropyl trimethoxysilane, glycidoxypropyltrimethoxysilane, bis(3-glycidoxypropyl) tetramethyldisiloxane, 3-glycidoxypropyl dimethylethoxysilane, and (3-glycidoxypropyl) methyldiethoxysilane. The silane can be added directly to the wet component when the coating composition is to be mixed from two components as described above. Alternatively, the silane can be predispersed or dissolved in water or a solvent such as methanol before being added to the coating composition mixture, or such a predispersed silane can be applied to the dry component before the liquid epoxy resin is blended therewith. Addition to the wet component is preferred for simplicity. Mixtures of silanes can also be used. The amount of silane employed is related to the type and proportion of fillers used in the coating composition. Preferably, the silane is employed in the coating composition at a level of at least about 0.1 percent by weight based on fine particle size silica. The silane component is suprisingly important for retention of strength during exposure of the cured coating composition to water and for the rate of strength development.

The coating composition of the present invention additionally comprises a fine particle size mineral as a functional filler. A fine particle size silica is especially preferred. As used in the present specification and claims, a "fine particle size filler" is one having a weight average particle size of from about 2 microns to about 50 microns. Examples of fine particle size fillers which can be used include 120, 325, and 400 mesh silicas, available from Smith Chemical & Color Co., Jamaica, N.Y.; Imsil® amorphous silica available from Illinois Minerals Co., Cairo, Ill.; Duramite® calcium carbonate, available from Thompson, Weinman & Co., Cartersville, Ga.; and No. 1 barytes (barium sulfate), available from Pfizer Corp., Easton, Pa. The fine particle size filler contributes to the compressive strength of the cured coating composition, with compressive strength and particle size inversely related in general. However, if too fine a particle size filler is employed, the resulting coating composition or mortar can become too thick and sticky for easy application. Preferably, the fine particle size filler has a mean particle size of from about 2 to 20 microns, with a mean particle size of from about 3 to 7 microns being more preferred, and, with a mean particle size of from about 4 to 6 microns being most preferred. Preferably, a fine particle size silica, such a 325 or 400 mesh silica, is used. The weight ratio of fine filler to coating composition solids depends on the particle size of the fine particle size filler used, the rheological requirements of the coating, and the chemical nature of that filler. When a fine particle size silica having a mean particle size of from about 3 to 7 microns is used, the weight ratio of fine particle size filler to coating composition solids is from about 0.05 to 0.50.

Larger particle size fillers, such as sand and aggregate can also be included in the coating composition to lower cost and provide desired properties. Examples of sands which can be included in the coating composition include Ottawa 20-30 mesh, ASTM C190, available from Fisher Scientific Co., Pittsburgh, Pa.; MDC No. 2 sand and 70 mesh sand, available from MDC Industries, Philadelphia, Pa.; and Stonclad ® GS gray sand, available from Stonhard, Inc., Maple Shade, N.J. Mixtures of large particle size fillers can be used to minimize the proportion of organic binder required to provide a mortar with good rheological properties. In a presently preferred embodiment for trowelled mortar, the inorganic component of the coating composition of the present invention includes from about 30 to 45 weight percent of small sand formed of angular particles having an average particle size of about 120 to 60 mesh, and from about 45 to 60 weight percent of a sand formed of angular particles having an average particle size of about 1-3 mm, such as MDC No. 2 sand, along with the fine filler.

In general, the nature of the sand to be used will be dictated by the intended use of the cured coating composition. For flooring applications, graded sands of medium particle size such as "Ottawa" sand, "MDC 70" sand, and "MDC #2" sand, and mixtures thereof, can be used to advantage. In such medium grade sands, fines will have been removed, yet the sieve size of the sand may vary over a fairly wide range.

Instead of or in addition to sand, it is possible to use ground glass, emery powder, diatomaceous earth, ground slag, fine gravel, trap rock, and similar aggregates.

The coating composition of the present invention can be mixed from the components thereof using conventional methods and equipment. Preferably, two intermediate components are first prepared, packaged, and stored, and then subsequently transported to the application site where they are mixed together in proportion to provide the coating composition. One component is preferably a "dry mix" including the fine particle size filler and the liquid epoxy resin, and optionally, other fillers such as large particle size sand or aggregate. These components can be mixed using conventional equipment for mixing particulate minerals, such as ribbon or rotary blenders. Preferably, the optional large particle size filler is first charged to the mixer, and the liquid epoxy resin is blended in. Subsequently, the fine particle size filler is charged and blended in to form the "dry mix." This order of addition is preferred to avoid the formation of clumps which tend to occur when the epoxy resin is blended first with the fine particle size filler. The second component or "wet mix" preferably includes the polymeric latex, the amine-functional epoxy curing agent, and the epoxy- or amine-functional silane, and can be prepared using any conventional low shear mixing equipment for liquids, with care being taken to avoid shear-induced coagulation or destabilization of the polymer latex. If desired, other components can be included in the wet mix, such as small amounts of defoaming agents; preservatives for the organic components such as fungicides and bacteriostats; uv stabilizers; colorants such as colored pigments and dyes; thickeners such as polyelectrolyte and cellulosic thickeners; rheology control agents such as associative thickeners and the like; cosolvents; additional water to adjust the solids level, and the like.

The compositions of the present invention can be used for multiple purposes. For example, they can be used as a bond coat or adhesive in adhering new Portland cement concrete to existing concrete, such as a new concrete overlay for an existing concrete floor; as a grout to repair cracks in existing concrete structures; as a bonding agent to adhere fresh Portland cement concrete to steel reinforcing rods or plates, as, for example, in pre-tensionsed or post-tensioned structural elements; as an adhesive grout for bonding aggregates, panels, or the like to walls to provide a decorative effect; as a protective overlay for concrete structures such as dams, bridge decks, piers, utility pylons, buildings, and the like subject to exterior exposure. The compositions can be used as flooring overlay and coatings over existing or new concrete, metal, or wood flooring, where protection against chemical attack is desired, such as in chemical plants, oil refineries, electroplating facilites, and the like, where exposure to acid is encountered, and also such as in food preparation facilities, soft-drink bottling plants, meat packing facilities, and dairies, where exposure to organic acids and alkalies occurs. Further, these coating compositions can be used as a protective coating for stone and concrete building facades and sculpture subject to degradation from acid rain; an the like.

The following examples are illustrative of the compositions and processes of the present invention, and will be useful to those of ordinary skill in the art in practicing the invention. However, the invention is in no way limited by these examples.

Unless otherwise specified, all percentages and proportions given in the following examples are by weight. The following test procedures were employed unless otherwised stated below.

Compressive strength was determined as follows: Wet coating composition was packed into 12.7 mm ($\frac{1}{2}$ inch) cube molds. The cubes were demolded after 18-24 hr, aged at room conditions for 5 days, heated at 60° C. for 24 hr., and aged again at room conditions for 7-14 days before testing. For early hardness measurements, the molds were 6.4 mm ($\frac{1}{4}$ inch) cubes in order to simulate more closely the thickness of an actual flooring overlay. The cubes were demolded after 24 hrs. Cubes were tested using a Model 900 Versa-Loader (Soiltest, Inc., Lake Bluff, Ill.) compression loading machine with a PR-60 proving ring. The rate of loading was 2 mm/min (0.08 in/min). Two cubes were tested dry, and another two after soaking in deionized water for a week. The wet cubes were not dried before testing. The variation in strengths between the two cubes for each test material was generally 5-10%.

Flexural strength was determined using bar samples with the following dimensions: 152.4 mm × 12.7 mm × 6.35 mm (6 in × 0.5 in × 0.25 in). Coating compositions were aged five days in molds before removal. Flexural strength was measured accoring to ASTM D 790 [101.6 mm (4 in) span, three-point loading, $4.66 \times 10^{-2}$ mm/sec (0.11 in/min) crosshead speed, 23° C., 50% R.H.; six test specimens, reported confidence intervals are 95% limits].

To test water absorption, cubes were immersed in water and weighed after 1 day and 7 days. The percentage weight gains were calculated.

Ultraviolet degradation was determined according to ASTM G-53 (Q-U-V Accelerated Weathering Tester, Q-Panel Co., Cleveland, Ohio, UVB-313 lamp, 8 h UV/57° C., 4 h CON/40° C.). For color measurements a Colorgard System 1000/05 (Gardner/Newtec Instrument Div., Pacific Scientific Co., Silver Spring, Md.) instrument was used to record the Hunter L, a, and b values.

To evaluate thermal shock, coating composition was applied to concrete as described below blocks and subjected to a cold-hot cycling test as follows:

| Thermal Shock Test Procedure | | |
|---|---|---|
| Cycle | Test Condition | Length of Time |
| 0 | Room Temp. | 1-2 wks. |
| 1 | Freezing, −3° F. (−16° C.) | 16 hrs. |
| 2 | Room Temp. | 8 hrs. |
| 3 | Freezing, −3° F. (−16° C.) | 16 hrs. |
| 4 | Hot water, 195-205° F. | 90 sec. |
| 5 | Room Temp. | 8 hrs. |
| 6 | Freezing, −3° F. (−16° C.) | 16 hrs. |
| 7 | Heat, 225° F. oven | 8 hrs. |
| 8 | Freezing, −3° F. (−16° C.) | 16 hrs. |
| 9 | Hot Water, 195° F. −205° F. (90-95° C.) | 1-2 min. |
| 10 | Room Temp. | 7¾ hrs. |
| 11 | Freezing, −3° F. (−16°) | 16 hrs. |
| 12 | Heat, 275° F. (135° C.) | 8 hrs. |
| 13 | Freezing, 3° F. (−16° C.) | 16 hrs. |
| 14 | Room Temp. | 7¾ hrs. |
| 15 | Freezing, −3° F. (−16° C.) | 16 hrs. |
| 16 | Heat, 350° F. (177° C.) | 8 hrs. |
| 17 | Freezing, −3° F. (−16° C.) | 16 hrs. |
| 18 | Heat, 225° F. | 8 hrs. |
| 19 | Freezing, −3° F. (−16° C.) | 16 hrs. |
| 20 | Room Temp | 8 hrs. |

Concrete blocks (304.8 mm × 152.4 mm (12 in × 6in), Pre-Cast concrete Products, Lansdale, Pa.) were used as supplied without surface treatment. A 127 mm (5 in) long strip of $2.54 \times 10^{-2}$ mm × (1 mil) Mylar ® film was centered on the block and coating composition was applied over a 254 mm × 101.6 mm (10 in × 4 in) area. The coating compositions were aged one to two weeks at room conditions before testing. They were not heated cured.

EXAMPLE 1

530.0 parts by weight of Ottawa 20-30 mesh (round particle) (Fisher Scientific Co.) sand and 265.0 parts by weight of 70 mesh (MDC Industries, Philadelphia, Pa.) sand were charged to a Hobart Model K5SS mixer (Hobart, Inc., Troy, Ohio) and blended at low speed. 17.4 parts by weight of Epon 828 (digycidyl ether of bisphenol A, 185-192 epoxy equivalent weight, Shell Chemical Co., Atlanta, Ga.) liquid epoxy resin were gradually added with mixing of the sand, and the mixture is subsequently mixed for five minutes. 187.6 parts by weight of Smithco TM 325 mesh (Smith Chemical & Color Co., Jamaica, Long Island, N.Y.) silica, a fine particle size filler, were then added, and mixing was continued for fifteen minutes. The resulting dry mix appeared to be free flowing sand with no obvious liquid present.

208 parts by weight of an acrylic polymer latex having a monomer composition of 45.6 percent by weight on polymer solids butyl acrylate, 53.1 percent by weight methyl methacrylate, and 1.3 percent by weight methacrylic acid (average latex particle size 160 nanometers, 50.0 percent by weight total solids, 0.4 percent by weight sodium lauryl sulfate) was mixed with 6.6 parts by weight Jeffamine ® EDR-148 polyethylene oxide diamine (approximate molecular weight 148, Texaco Chemical Co., Bellaire, TX), and 1.0 parts by weight Z-6020 silane (3-(2-aminoethyl)-aminopropyl trimethoxysilane, Dow Corning Corp, Midland, Mich.) using a propeller agitator to provide a mixture having a pH of about 10.3 and viscosity of about 70 centipoise. Subsequently, 1.4 parts by weight Nopco NXZ defoamer (Nopco Chemicals Div., Diamond Shamrock Chemical Co., Newark, N.J.) and 16.0 parts by weight water were mixed therewith to provide a wet mix.

116.7 parts by weight of wet mix were added to 1000.0 parts by weight of dry mix and were blended by hand with a spatula for five minutes to form a coating or mortar composition according to the present invention.

The coating composition was packed into 12.7 mm (½ inch) and 6.4 mm (¼ inch) cube molds. The cubes were demolded after 18-24 and aged subsequently indoors. The compressive strength of the cubes as a function of aging is shown in Table I. The results show that the 6.4 mm cubes, which approximate the thickness of Portland cement concrete floor overlays, cure rapidly to provide high compressive strength.

The chemical resistance of 12.7 mm cubes, cured 14 days under indoor ambient conditions, is shown in Table II. Good resistance to organic solvents and aqueous acids is shown.

The coating composition was formed into cylinders 6.4 mm thick and 3.81 cm in diameter, and the splitting tensile strength was measured as a function of cure at indoor ambient conditions. The splitting tensile strength of the cured composition is compared with that of a commercial epoxy/amine mortar (Comparative Example I) in Table III. The composition of the present invention showed rapid development of substantial tensile strength, when compared with the commercial epoxy/amine mortar, although the coating compositon has only about one-half the level of organic solids than the commercial epoxy/amine mortar, and is consequently less costly. The coating composition passed all 20 steps of the thermal shock test, while the epoxy control cracked at step 12.

TABLE I

| | Compressive Strength (psi) | |
|---|---|---|
| Cure (days) | 6.5 mm Cubes | 12.7 mm Cubes |
| 1 | 2930 | 595 |
| 2 | 5350 | 2580 |
| 7 | 7280 | 5027 |
| 14 | 8080 | 6760 |
| 21 | | 7010 |
| 32 | | 7680 |

TABLE II

| | Weight Change (Percent) | | Compressive Strength After 7 Day Soak | |
|---|---|---|---|---|
| Cubes Soaked in | 1 Day | 7 Day | Psi | % Retained |
| Water | +0.6 | +0.9 | 6810 | 90.1 |
| Skydrol hydraulic fluid | +1.1 | +1.8 | 4930 | 65.2 |
| 10% sulfuric acid (scrubbed before weighing) | +0.6 | +1.0 | 6140 | 81.2 |
| 10% lactic acid (scrubbed before weighing) | +0.9 | +1.5 | 5430 | 71.8 |

TABLE III

| | Splitting Tensile Strength[1] | |
|---|---|---|
| Cure | Example 1[2] | Comp. Ex. 1[3] |
| 1 day | 160 | 695 |
| 2 days | 380 | 850 |
| 7 days | 725 | 1120 |

TABLE III-continued

| | Splitting Tensile Strength[1] | |
|---|---|---|
| Cure | Example 1[2] | Comp. Ex. 1[3] |
| 14 days | 940 | |

[1]Psi, 3.81 cm diameter × 0.63 cm cylinders.
[2]7.0 weight percent organic material
[3]13.0 weight percent organic material, commercial epoxy/amine polymer concrete

EXAMPLE 2

The preparative process of Example 1 was repeated, except that 10.6 grams Jeffamine D-230 (polypropylene oxide diamine, MW=230) was used in place of Jeffamine EDR-148. The resulting coating composition was cast to provide bars (152.4 mm by 12.7 mm by 6.35 mm) and aged five days under indoor ambient conditions before removal. Flexural strength was measured according to ASTM D 790 (101.6 mm span, three-point loading, 4.66×10$^{-2}$ mm/sec crosshead speed, 23° C., 50% relative humidity) and compared with that of a commercial epoxy/amine mortar, the results being displayed in Table IV. The coating composition according to the present invention is seen to provide good flexural strength and elongation, with comparable modulus to the commercial epoxy/amine mortar having almost twice the organic content. Table V shows the chemical resistance of 6.4 mm cubes of the coating composition cured as described above. The cured coating composition shows good resistance to the aqueous base and acid, with fair resistance to the organic solvent.

TABLE IV

| Coating Material[1] | Strength (psi) | Flexural Strength Elongation (%) | Modulus (psi) |
|---|---|---|---|
| Example 2[2] | 3190 | 1.2 | 1,160,000 |
| Comp. Ex. 2[3] | 3070 | 0.3 | 1,430,000 |

[1]3.2 mm thick bars, ultimate cure
[2]7.1 percent by weight organic material
[3]13.0 percent by weight organic material, commercial epoxy/amine polymer concrete

TABLE V

| | Weight Change (Percent) | | Compressive Strength After 7 Day Soak | |
|---|---|---|---|---|
| Cubes Soaked in | 1 Day | 7 Day | Psi | % Retained |
| 10% acetic acid | +1.4 | +2.5 | 4450 | 59 |
| 10% sodium hydroxide | +0.6 | +1.1 | 5000 | 66 |
| Xylene | +5.0 | +7.5 | 600 | 8 |

EXAMPLES 3-7

The preparative process of Example 1 was repeated using the components and the proportions shown in Table VI to provide Examples 3-7 and Comparative Examples 3-10 as given in Table VIII.

TABLE VI

| Dry Mix Formulations | | | | |
|---|---|---|---|---|
| | "A" (With Fine Filler) | "B" (Without Fine Filler) | Coating Formulation | |
| | | | Dry mix | 188.68 g |
| | | | Polymer latex[8] (solids) | 10.28 g |
| Ottwa 20-30[1] | 50.00 g | 61.80 g | Nopco NXZ[9] | 0.13 g |
| MDC No. 2[2] | 50.00 g | 61.80 g | Jeffamine D-230[10] | 1.00 g |
| 70 mesh[3] | 50.00 g | 61.80 g | Z-6020 silane[11] or Tyzor TBT[12] | 0.10 g |

TABLE VI-continued

| Dry Mix Formulations | | | |
|---|---|---|---|
| | "A" (With Fine Filler) | "B" (Without Fine Filler) | Coating Formulation |
| Fine filler = silica[4] or CaCO$_3$[5] | 35.40 g | — | |
| Fine filler = barytes[6] | 57.70 g | — | |
| Epon 828[7] | 3.28 g | 3.28 g | |

[1]Sand, ASTM C 190, Fisher Scientific Co., Pittsburgh, PA.
[2]Sand, MDC Industries, Philadelphia, PA.
[3]Sand, MDC Industries.
[4]Smithco ™ 120, 325, 400 mesh silicas, Smith Chemical & Color Co., Jamaica, Long Island, NY. Imsil amorphous silica, Illinois Minerals Co., Cairo, IL.
[5]Duramite ® calcium carbonate, Thompson, Weinman & Co., Cartersville, GA.
[6]No. 1 Barytes barium sulfate, Pfizer Corp., Easton, PA.
[7]Diglycidyl ether of bisphenol A, epoxy equivalent weight 185-192, Shell Chemical Co., Atlanta, GA.
[8]Monomer composition (Latexes A, B and C): 50 ethyl acrylate/47 methyl methacrylate/2 adhesion promoter/1 methacrylic acid (w/w); 6 percent by weight Triton ® X-405 nonionic surfactant; Polymer latex "A" has an average particle size of 230 nm; Polymer latex "B" has an average particle size of 269 nm; Polymer latex "C" has an average particle size of 212 nm.
[9]Defoamer, Nopco Chemical Div., Diamond Shamrock Chemical Co., Newark, NJ.
[10]Polypropylene oxide diamine, approximate molecular weight 230, Texaco Chemical Co., Bellaire, TX.
[11]3-(2-aminoethyl)-aminopropyl triethoxysilane, Dow Corning Corp., Midland, MI.
[12]Tetra-n-butyl titanate, Du Pont de Nemours Co., Wilmington, DE (optional component).

The mean particle size and oil absorption of various fine particle size fillers are given in Table VII.

TABLE VII

| Fillers | Average Diameter (microns) | Particle Size (microns) | Typical Oil Absorption |
|---|---|---|---|
| 120 mesh silica | 10.2 | — | 15.0 |
| 325 mesh silica | 5.0 | — | 26.0 |
| 400 mesh silica | 4.4 | — | 26.4 |
| Duramite calcium carbonate | 5.5 | 12.5 | 5.5 |
| No. 1 Barytes (barium sulfate) | | 8.3 | 11.0 |
| Imsil A-15 amorphous silica | 1.7 | 2.5 | 23-25 |

The effects of varying the particle size of the fine filler, the particle size of the polymer latex, and the silane on the trowelability of the uncured coating composition, and the wet and dry compressive strength of the cured coating composition, are shown in Table VIII A-C.

Compressive strengths are seen to be much higher when fine filler is added than when it is omitted, and replaced with an equivalent volume of sand. In addition, compressive strengths are found to be higher when fine silica is used rather than calcium carbonate or barium sulfate. The silane increased compressive strengths with each filler used, with the greatest increases being observed for the fine silicas. On the other hand, the titanate reduced the compressive strength.

In general, the finer the particle size of the fine particle size filler, the higher the compressive strength observed, up to a point (e.g., compare Example 5 with Example 7). Nevertheless, if particle size becomes too small, the wet coating composition becomes thick, sticky, and gells quickly. This occurred with Imsil A-15 amorphous silica. Compressive strengths are not significantly greater for 400 mesh silica (Example 7) than with 325 mesh silica (Example 6). Trowelability of the 400 mesh and 325 mesh silica coating compositions is similar, except that the 400 mesh silica composition is somewhat stickier when a large particle size, high solids, anionic polymer latex otherwise similar to Latex A is used. The results reported in Table VIII show that the fine particle size filler, and especially the 325 mesh and 400 mesh silica, and the silane, provide a fluid coating composition with good trowelability and curing to a solid with high compressive strength.

TABLE VIII A

| Example | Comp. 3[1] | Comp. 4 | Comp. 5 | 3 | Comp. 6 |
|---|---|---|---|---|---|
| Filler[2] | None | None | Barytes | Barytes | Duramite |
| Latex[3] | A | A | A | A | B |
| Silane | None | Z-6020 | None | Z-6020 | None |
| SandVol[4] | 74.1 | 74.0 | 60.0 | 59.9 | 63.0 |
| FillVol[5] | 0.0 | 0.0 | 14.7 | 14.9 | 14.8 |
| OrgVol[6] | 14.9 | 15.0 | 14.7 | 14.9 | 14.8 |
| WaterVol[7] | 11.0 | 11.0 | 11.1 | 11.1 | 11.0 |
| LatexPct[8] | 74.1 | 70.1 | 70.6 | 70.1 | 70.6 |
| EpoxyPct[9] | 19.8 | 22.4 | 22.5 | 22.4 | 22.5 |
| AminePct[10] | 6.1 | 6.8 | 6.9 | 6.8 | 6.9 |
| SilanPct | 0.0 | 0.7 | 0.0 | 0.7 | 0.0 |
| Trowel[12] | Sandywet | Sandywet | Excellnt | Excellnt | Excellnt |
| Water1Day[13] | 2.18 | 2.01 | 0.19 | 0.70 | 0.68 |
| Water7Day[14] | 3.08 | 2.75 | 1.04 | 1.36 | 1.31 |
| DryCompr[15] | 3010 | 4250 | 8280 | 6280 | 8270 |
| WetCompr[16] | 1510 | 2570 | 3580 | 4500 | 3880 |

[1]"Comp." = Comparative Example.
[2]Type of fine filler employed.
[3]Type of polymeric latex employed, see Table VI.
[4]Calculated volume percent of sand; density of sand assumed to be 2.65 g/cm$^3$.
[5]Calculated volume percent of fine filler; density of silica assumed to be 2.65 g/cm$^3$; density of barium sulfate assumed to be 4.4 g/cm$^3$; density of calcium carbonate assumed to be 2.7 g/cm$^3$.
[6]Calculated volume percent of organic material; densities of latex epoxy/amine reaction product assumed to 1.05 g/cm$^3$; density of silane assumed to be 1.02 g/cm$^3$.
[7]Calculated volume percent of water.
[8]Calculated volume percent of latex polymer.
[9]Calculated volume percent of epoxy resin.
[10]Calculated volume percent of amine.
[11]Calculated volume percent of silane.
[12]Observed trowelablity of uncured coating composition. The samples ratings are abbreviated as follows:
Excellent ("Excellnt") is the best rating. All other ratings indicate varying deficiencies.
GoodDry = good but somewhat dry
ThikCrum = too viscous and crumbly
DrySlsti = dry, sticks slightly to spatula
VDrySndy = very dry, sandy
Soupy = too soupy (wet) and low in viscosity
VGSoupy = very good but somewhat soupy
GDSLSand = good but slighty sandy
[13]The percent weight gain of a 12.7 mm cube after immersion in water for one day.
[14]The percent weight gain of a 12.7 mm cube after immersion in water for seven days.
[15]The dry compressive strength of 12.7 mm cube, psi.
[16]The compressive strength of a 12.7 mm cube after a seven day water soak, psi.

TABLE VIII B

| Example | 4 | Comp. 7 | 5 | Comp. 8 |
|---|---|---|---|---|
| Filler[2] | Duramite | Silic120 | Silic120 | Silic325 |
| Latex[3] | A | A | A | A |
| Silane | Z-6020 | None | Z-6020 | None |
| SandVol[4] | 59.9 | 60.0 | 59.9 | 60.0 |
| FillVol[5] | 14.9 | 14.7 | 14.9 | 14.7 |
| OrgVol[6] | 14.9 | 14.7 | 14.9 | 14.7 |
| WaterVol[7] | 11.1 | 11.1 | 11.1 | 11.1 |
| LatexPct[8] | 70.1 | 70.6 | 70.1 | 70.6 |
| EpoxyPct[9] | 22.4 | 22.5 | 22.4 | 22.5 |
| AminePct[10] | 6.8 | 6.9 | 6.8 | 6.9 |
| SilanPct[11] | 0.7 | 0.0 | 0.7 | 0.0 |
| Trowel[12] | Excellnt | Excellnt | Excellnt | Excellnt |
| Watr1Day[13] | 1.38 | 0.70 | 0.93 | 0.60 |
| Watr7Day14 | 2.02 | 1.30 | 1.65 | 1.12 |
| DryCompr[15] | 8860 | 8865 | 8660 | 9435 |
| WetCompr[16] | 4660 | 3810 | 7280 | 5420 |

TABLE VIII C

| Example | 6 | Comp. 9 | Comp. 10 | 7 |
|---|---|---|---|---|
| Filler | Silic325 | Silic325 | Silic400 | Silic400 |
| Latex | A | C | A | A |
| Silane | Z-6020 | TyzorTBT | None | Z-6020 |
| SandVol | 59.9 | 59.8 | 60.0 | 59.9 |
| FillVol | 14.9 | 15.0 | 14.7 | 14.91 |
| OrgVol | 14.9 | 15.0 | 14.7 | 14.9 |
| WsterVol | 11.1 | 11.1 | 11.1 | 11.1 |
| LatexPct | 70.1 | 70.1 | 70.6 | 70.1 |
| Epoxypct | 22.4 | 22.4 | 22.5 | 22.4 |
| AminePct | 6.8 | 6.8 | 6.9 | 6.8 |
| SilanPct | 0.7 | 0.7 | 0.0 | 0.7 |
| Trowel | Excellnt | Excellnt | Excellnt | Excellnt |
| Watr1Day | 0.91 | 0.83 | 0.68 | 0.49 |
| Watr7Day | 1.54 | 1.75 | 1.22 | 0.85 |
| DryCompr | 11000 | 5870 | 9390 | 11420 |
| WetCompr | 8600 | 387 | 4970 | 8810 |

EXAMPLES 8–25

The preparative process of Example 1 is repeated using the components and the proportions shown in Table VI, except that 1.09 g of Hardener HY-955 polyamidoamine (Ciba-Geigy Corp., Hawthorne, N.Y.) was substituted for the 1.00 g of Jeffamine D-230, and the polymer latex employed is described in Table IX.

TABLE IX

| Latex | Monomer Composition[1] | Particle Size[2] | $T_g$[3] | Surfact.[4] |
|---|---|---|---|---|
| A | 50 ethyl acrylate<br>42 methyl methacrylate<br>1 methacrylic acid<br>2 adhesion promoter | 230 nm | | 6% N |

TABLE IX-continued

| Latex | Monomer Composition[1] | Particle Size[2] | $T_g$[3] | Surfact.[4] |
|---|---|---|---|---|
| D | 66 ethyl acrylate<br>31 methyl methacrylate<br>1 methacrylic acid<br>2 adhesion promoter | 140–150 nm | 7° C. | 6% N |
| E | 43 ethyl acrylate<br>54 methyl methacrylate<br>1 methacrylic acid<br>2 adhesion promoter | 120–130 nm | 33° C. | 6% N |
| F | 10 ethyl acrylate<br>89.5 methyl methacrylate<br>0.5 methacrylic acid | 80 nm | 103° C. | 6% N<br>2.7% A |
| G | 66 ethyl acrylate<br>31 methyl methacrylate<br>1 methacrylic acid<br>2 adhesion promoter | 219 nm | | 6% N |
| H | 43 ethyl acrylate<br>54 methyl methacrylate<br>1 methacrylic acid<br>2 adhesion promoter | 233 nm | | 6% N |
| I | 33 ethyl acrylate<br>64 methyl methacrylate<br>1 methacrylic acid<br>2 adhesion promoter | 226 nm | | 6% N |
| J | 50.0 butyl acrylate<br>48.7 methyl methacrylate<br>1.3 methacrylic acid | 170 nm | | 0.4% A |
| K | 45.6 butyl acrylate<br>53.1 methyl methacrylate<br>1.3 methacrylic acid | 170 nm | | 0.4% A |
| L | 45.6 butyl acrylate<br>53.1 methyl methacrylate<br>1.3 methacrylic acid | 170 nm | | 0.4% A |
| M | 40.0 butyl acrylate<br>58.7 methyl methacrylate<br>1.3 methacrylic acid | 166 nm | | 0.4% A |

[1]Weight percent monomer.
[2]Mean particle size measured by laser light scattering (Nano-Sizer ®).
[3]Glass transition temperature as estimated by which the torsional modulus of an air-dried film is 300 kg/cm$^2$.
[4]Weight percent on polymer solids of surfactant added during polymerization; N = nonionic, A = anionic.

Figure 2:
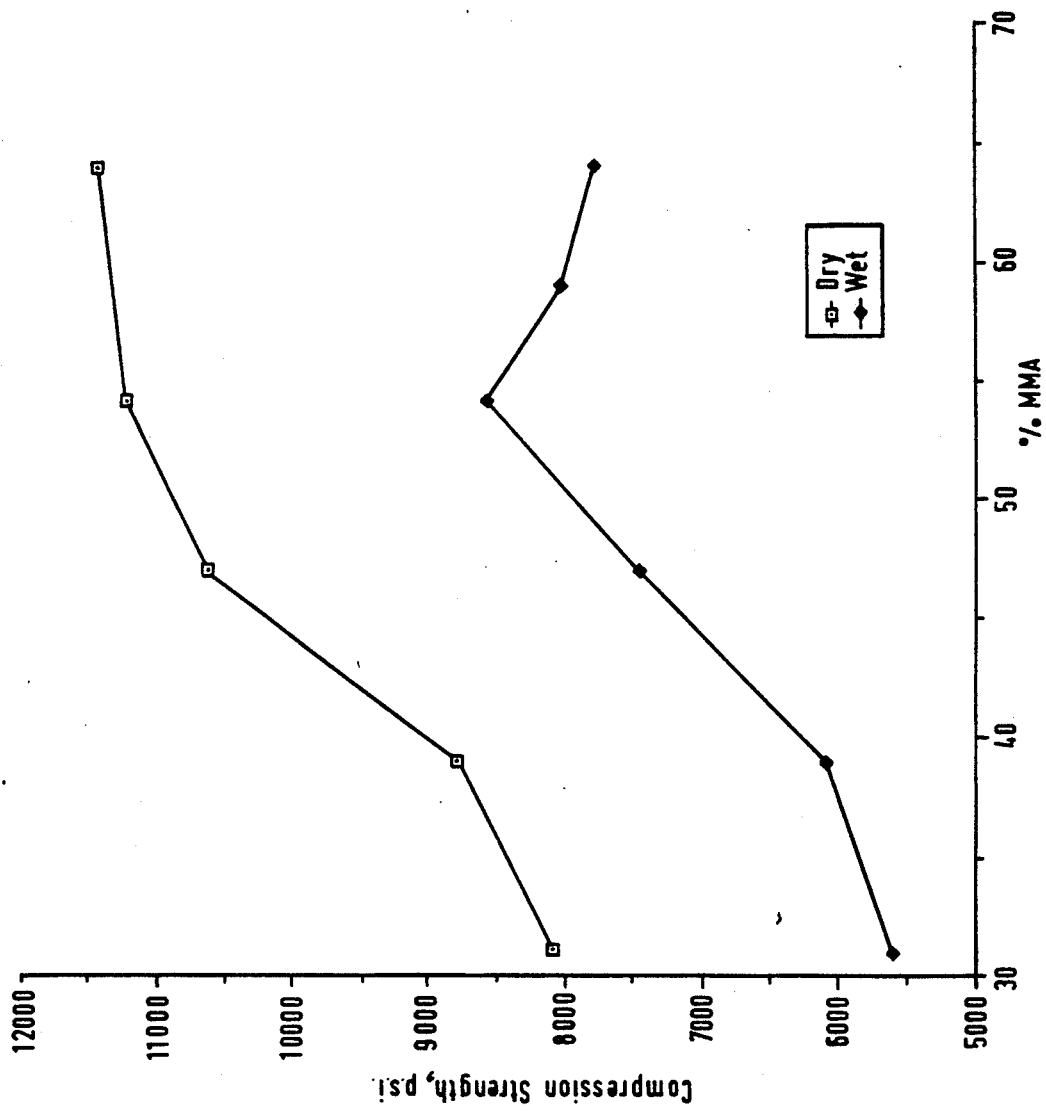
FIG. 2 is a graph of the compressive strength (wet and dry) of cured coating compositions of the present invention as a function of the weight percentage of methyl methacrylate for a series of methyl methacrylate/ethyl acrylate copolymer latexes.

The influence of latex polymer hardness on the application properties of the coating composition is shown in Tables X through XII and in FIGS. 1-3. In Tables X and XI the properties of two series of coatings compositions (Examples 8-15 and Examples 16-21) prepared using a series of ethyl acrylate/methyl methacrylate copolymer latexes are reported. The polymer latexes (A, D-F) for Examples 8-15 were prepared using different polymerization processes, while a single process was used for the polymer latexes (A, G-I) of Examples 16-21. The compressive strengths of cured coatings compositions of the first series are shown in FIG. 1; the compressive strengths of cured compositions of the second series are shown in FIG. 2.

Examples 22-25 constitute a third series, based on butyl acrylate/ methyl methacrylate copolymer latexes (J-M). The properties of this third series of coating compositions are reported in Table XII, and the compressive strengths of cured coating compostions of this series are reported in FIG. 3.

These results show that the compressive strength of cured coating compositions increases with the glass transition temperature of the polymeric latex, except for compositions formulated using blends including a very "hard" polymer latex, latex F ($T_g$=103° C.), Examples 13 and 14. FIG. 1 shows that wet and dry compressive strengths pass through a maximum at about 55° C. As the acrylic polymer/epoxy resin/amine system became harder with increasing methyl methacrylate content, strength first increased but then decreased. The first series, Example 8-15, employed polymer latexes prepared using different polymerization processes and having different particle sizes; yet the compressive strengths shown in FIG. 1 lie on a well-behaved curve, showing that the compressive strength of the coating compositions depended only on the hardness of the polymer latexes.

Both the second and third series also showed increasing compressive strengths with increasing polymer latex hardness, although the maximum level of methyl methacrylate used in the butyl acrylate series was not high enough to provide a maximum in the compressive strengths shown in FIG. 3.

As compressive strength is desirable in a cured coating or overlay for Portland cement concrete, a polymer latex with a glass transition temperature of at least about 0° C. is preferred. On the other hand, too great a polymer latex hardness may result in cracking or delamination. Thus, a polymer latex with a glass transition temperature of less than about 30° C. is preferred., The type of amine curing agent used also influences cracking of the cured coating composition. For example, a coating composition including latex L showed cracking when trimethyl hexamethylene diamine ("TMD") was used as the epoxy curing agent, while no cracking was observed when the Jeffamine D-230 was substituted for the TMD.

TABLE X A

| Example | 8 | 9 | 10 | 11 |
|---|---|---|---|---|
| Filler | Silica325 | Silica325 | Silica325 | Silica325 |
| Latex | D | A | 70% E/<br>30% G | E |

TABLE X A-continued

| Example | 8 | 9 | 10 | 11 |
|---|---|---|---|---|
| Silane | Z-6020 | Z-6020 | Z-6020 | Z-6020 |
| SandVol | 59.0 | 57.5 | 59.4 | 57.1 |
| FillVol | 13.9 | 13.6 | 14.0 | 13.5 |
| OrgVol | 14.8 | 16.3 | 14.9 | 16.2 |
| WaterVol | 12.1 | 12.6 | 11.7 | 13.2 |
| LatexPct | 69.7 | 73.7 | 69.6 | 73.3 |
| Epoxypct | 22.2 | 19.6 | 22.3 | 19.6 |
| AminePct | 7.4 | 6.5 | 7.4 | 6.5 |
| SilanPct | 0.7 | 0.6 | 0.7 | 0.6 |
| Trowel | DrySandy | Excellnt | Fair | Excellnt |
| Watr1Day | 3.83 | 0.91 | 0.84 | 1.78 |
| Watr7Day | 4.24 | 1.65 | 1.61 | 3.00 |
| DryCompr | 2680 | 9310 | 10600 | 8920 |
| WetCompr | 1680 | 6720 | 8870 | 6840 |

TABLE X B

| | Example | | | |
|---|---|---|---|---|
| | 12 | 13 | 14 | 15 |
| Filler | Silica325 | Silica325 | Silica325 | Silica325 |
| Latex | E | 70% E/ 30% F | 50% E/ 50% F | F |
| Silane | Z-6020 | Z-6020 | Z-6020 | Z-6020 |
| SandVol | 59.5 | 58.7 | 58.2 | 57.0 |
| FillVol | 14.1 | 13.9 | 13.8 | 13.5 |
| OrgVol | 14.9 | 14.7 | 14.6 | 14.3 |
| WsterVol | 11.5 | 12.7 | 13.4 | 15.2 |
| LatexPct | 69.7 | 69.7 | 69.7 | 69.7 |
| Epoxypct | 22.2 | 22.2 | 22.2 | 22.2 |
| AminePct | 7.4 | 7.4 | 7.4 | 7.4 |
| SilanPct | 0.7 | 0.7 | 0.7 | 0.7 |
| Trowel | Excellnt | Excellnt | Excellnt | Excellnt |
| Watr1Day | 0.93 | 2.48 | 3.03 | 4.15 |
| Watr7Day | 1.73 | 4.05 | 4.19 | 4.36 |
| DryCompr | 12800 | 9390 | 7780 | 4710 |
| WetCompr | 10300 | 6910 | 5180 | 3790 |

TABLE XI

| | Example | | | | | |
|---|---|---|---|---|---|---|
| | 16 | 17 | 18 | 19 | 20 | 21 |
| Filler | Silic325 | Silic325 | Silic325 | Silic325 | Silic325 | Silic325 |
| Latex | G | 50% G/ 50% A | A | E | 50% E/ 50% I | I |
| Silane | Z-6020 | Z-6020 | Z-6020 | Z-6020 | Z-6020 | Z-6020 |
| SandVol | 57.6 | 57.6 | 57.5 | 57.4 | 57.6 | 57.6 |
| FillVol | 13.6 | 13.6 | 13.6 | 13.6 | 13.6 | 13.6 |
| OrgVol | 16.3 | 16.2 | 16.2 | 16.2 | 16.2 | 16.3 |
| WsterVol | 12.5 | 12.6 | 12.7 | 12.8 | 12.6 | 12.5 |
| LatexPct | 73.7 | 73.7 | 73.7 | 73.3 | 73.7 | 73.7 |
| EpoxyPct | 19.7 | 19.7 | 19.7 | 19.7 | 19.7 | 19.7 |
| AminePct | 6.0 | 6.0 | 6.0 | 6.0 | 6.0 | 6.0 |
| SilanPct | 0.6 | 0.6 | 0.6 | 0.6 | 0.6 | 0.6 |
| Trowel | Excellnt | Excellnt | Excellnt | Excellnt | Excellnt | Excellnt |
| Watr1Day | 0.63 | 1.24 | 1.72 | 1.46 | 2.02 | 2.29 |
| Watr7Day | 1.05 | 1.84 | 2.13 | 2.37 | 2.35 | 2.66 |
| DryCompr | 8090 | 8780 | 10600 | 11200 | — | 11400 |
| WetCompr | 5610 | 6090 | 7450 | 8560 | 8020 | 7760 |

TABLE XII

| | Example | | | |
|---|---|---|---|---|
| | 22 | 23 | 24 | 25 |
| Filler | Silic325 | Silic325 | Silic325 | Silic325 |
| Latex | J | L | K | M |
| Silane | Z-6020 | Z-6020 | Z-6020 | Z-6020 |
| SandVol | 58.2 | 57.6 | 58.4 | 58.3 |
| FillVol | 13.8 | 13.6 | 13.8 | 13.8 |
| OrgVol | 16.4 | 16.3 | 16.5 | 16.4 |
| WsterVol | 11.6 | 12.7 | 11.3 | 11.5 |
| LatexPct | 73.7 | 73.7 | 73.7 | 73.3 |
| EpoxyPct | 19.7 | 19.7 | 19.7 | 19.7 |
| AminePct | 6.0 | 6.0 | 6.0 | 6.0 |
| SilanPct | 0.6 | 0.6 | 0.6 | 0.6 |
| Trowel | Excellnt | Excellnt | Excellnt | Excellnt |
| Watr1Day | 0.21 | 0.35 | 0.25 | 0.31 |
| Watr7Day | 0.46 | 0.66 | 0.57 | 0.61 |
| DryCompr | 7750 | 9280 | 9030 | 10300 |
| WetCompr | 7160 | 7500 | 7720 | 9230 |

EXAMPLES 26–38

The preparation process of Example 1 was repeated using the components and the proportions shown in Table VI, except that a variety of polymer latexes of differing chemical composition are employed, including acrylic, stryene/butadiene, and vinyl acetate homo- and copolymer polymer latexes. The resulting coating composition properties are shown in Table XIII. These results show that coating compositions of the present invention can be prepared using polymeric latexes having different chemical compositions. Preferably, polymer latexes which dry to give a strong water-resistant film, are used.

Two styrene/butadiene polymer latexes, Polysar ® 9010 and Dow 640, and an ethyl acrylate/vinyl chloride polymer latex, Geon 460X45, gave cured coating compositions with high compressive strengths. As with acrylic polymer latexes, the compressive strengths increased with the hardness of the polymer latex (with increasing styrene content in the styrene/butadiene latexes).

Polyco 780 polyvinyl acetate latex gave a cured coating composition with high dry compressive strength, but very low wet compressive strength, presumably resulting from the water sensitivity of the vinyl acetate homopolymer. Polyco 2186 polyvinyl acetate copolymer, also produced a cured coating composition, with a relatively low ratio of wet to dry compressive strength, reflecting the water sensitivity of the copolymer latex. ZW-2028 polysulfide rubber latex provided a cured coating composition with a low compressive strength, apparently resulting from the weak and brittle nature of the rubber itself. On the other hand, the ratio of wet to dry compressive strengths for cured coating compositions prepared using this polymer latex was high, as the polymer cures to give a highly water resistant film.

TABLE XIII A

| | Example | | | | |
|---|---|---|---|---|---|
| | 26 | 27 | 28 | 29 | 30 |
| Filler | Silic325 | Silic325 | Silic325 | Duramite | Silic325 |
| Latex[1] | Gn460X45 | Psar9010 | Dow640 | Psar1186 | Dow460 |
| Silane | Z-6020 | Z-6020 | Z-6020 | Z-6020 | Z-6020 |
| SandVol | 57.4 | 60.2 | 59.7 | 59.3 | 59.5 |
| FillVol | 13.6 | 14.2 | 14.0 | 13.7 | 14.0 |
| OrgVol | 16.2 | 15.0 | 14.8 | 14.8 | 14.9 |
| WsterVol | 12.8 | 10.6 | 11.5 | 12.2 | 11.7 |
| LatexPct | 73.7 | 70.1 | 70.1 | 70.1 | 70.1 |
| EpoxyPct | 19.7 | 22.4 | 22.4 | 22.4 | 22.4 |
| AminePct | 6.0 | 6.8 | 6.8 | 6.8 | 6.8 |
| SilanPct | 0.6 | 0.7 | 0.7 | 0.7 | 0.7 |
| Trowel | Excellnt | Excellnt | Excellnt | Excellnt | Excellnt |
| Watr1Day | 0.72 | 1.77 | 0.63 | 1.85 | 1.57 |
| Watr7Day | 1.12 | 2.52 | 1.29 | 2.01 | 2.17 |
| DryCompr | 11300 | 8630 | 8910 | 4050 | 3150 |
| WetCompr | 8780 | 7120 | 8320 | 1810 | 2700 |

[1] Geon ® 460X45 is a copolymer latex of ethyl acrylate, vinyl chloride and N-methylol acrylamide available from B. F. Goodrich Co., Cleveland, OH.
Polysar ® 9010 is a styrene/butadiene copolymer latex (83 wt. % styrene) available from Polysar, Inc., Chattanooga, TN.
Polysar 1186 is a styrene/butadiene copolymer latex (66 wt. % styrene).
Dow 640 is a styrene/butadiene copolymer latex ($T_g$ = 10° C.), available from Dow Chemical Co., Midland, MI.
Dow 460 is a styrene/butadiene copolymer latex.
Acronal ® 627 is an acrylic copolymer latex available from BASF Chemical Co.
Acronol 18D is an acrylic copolymer latex available from BASF Chemical Co.
ZW-2028 is a polysulfide rubber (300,000 molecular weight) available from Morton-Thiokol, Morton Chemical Division, Woodstock, IL.

TABLE XIII B

| | Example | | | | |
|---|---|---|---|---|---|
| | 31 | 32 | 33 | 34 | 35 |
| Filler | Silic325 | Silic325 | Silic325 | Silic325 | Duramite |
| Latex | Acrnl18D | Acrnl18D | Acrnl627 | Acrnl627 | Polco780 |
| Silane | Z-6020 | Z-6020 | Z-6020 | Z-6020 | Z-6020 |
| SandVol | 60.0 | 57.4 | 59.6 | 56.9 | 59.4 |
| FillVol | 14.2 | 13.5 | 14.1 | 13.4 | 13.8 |
| OrgVol | 14.3 | 14.3 | 14.8 | 14.2 | 16.5 |
| WsterVol | 10.9 | 14.8 | 11.5 | 15.5 | 10.3 |
| LatexPct | 70.1 | 99.3 | 70.1 | 99.3 | 73.2 |
| EpoxyPct | 22.4 | 0.0 | 22.4 | 0.0 | 20.0 |
| AminePct | 6.8 | 0.0 | 6.8 | 0.0 | 6.1 |
| SilanPct | 0.7 | 0.7 | 0.7 | 0.7 | 0.7 |
| Trowel | GoodDry | Excellnt | DrySlsti | Excellnt | ThikCrum |
| Watr1Day | 0.30 | 2.39 | 0.56 | 2.46 | 2.37 |
| Watr7Day | 0.60 | 3.60 | 1.27 | 3.29 | 3.20 |
| DryCompr | 9090 | 3640 | 6060 | 2460 | 11100 |
| WetCompr | 7270 | 831 | 4800 | 846 | 1950 |

TABLE XIII C

| | Example | | |
|---|---|---|---|
| | 36 | 37 | 38 |
| Filler | Duramite | Silic325 | Silic325 |
| Latex | Polc2186 | ZW-2080 | Z2028H20 |
| Silane | Z-6020 | Z-6020 | Z-6020 |
| SandVol | 59.4 | 60.7 | 57.7 |
| FillVol | 13.8 | 14.3 | 13.6 |
| OrgVol | 16.5 | 15.1 | 14.3 |
| WsterVol | 10.3 | 9.9 | 14.4 |
| LatexPct | 73.2 | 70.1 | 70.1 |
| EpoxyPct | 20.0 | 22.4 | 22.4 |
| AminePct | 6.1 | 6.8 | 6.8 |
| SilanPct | 0.7 | 0.7 | 0.7 |
| Trowel | ThikCrum | VDrySndy | VDrySndy |
| Watr1Day | 0.59 | 5.22 | 3.87 |
| Watr7Day | 1.35 | 5.90 | 4.28 |
| DryCompr | 6750 | 1230 | 1900 |
| WetCompr | 2460 | 991 | 1490 |

EXAMPLES 39–41

The preparative process of Example 1 was repeated using the coatings formulations of Table XIV. The effect of omitting the epoxy resin and the amine curing agent is shown by the results for cured coating compositions reported in Table XV. Much poorer wet compressive strength is shown in the absence of the epoxy resin and the amine curing agent. When amine curing agent or epoxy resin are added alone, compressive strength is found to be less than when both are added. Comparison of the results for Example 39 with those for Comparative Example 11 show that addition of the epoxy/amine is advantageously more effective than merely crosslinking the polymer latex in raising compressive strength and lowering water absorption.

TABLE XIV

| | Example: | | | | | |
|---|---|---|---|---|---|---|
| | 39 | Comp. 11 | 40 | Comp. 12 | 41 | Comp. 13 |
| Dry mix[1] | 188.68 | — | 188.60 | — | 188.68 | — |
| Dry mix[2] | — | 185.40 | — | 185.40 | — | 185.40 |
| Latex N (48.7%)[3] | 29.89 | 21.10 | — | — | — | — |
| Acronal 627 (48.6%) | — | — | — | — | — | — |
| Acronal 18D (50.0%) | — | — | — | — | 20.56 | 29.12 |
| Nopco NXZ | 0.13 | 0.13 | 0.13 | 0.13 | 0.13 | 0.13 |
| Jeffamine D-230 | 1.00 | — | 1.00 | — | 1.00 | — |
| Z-6020 silane | 0.10 | 0.10 | 0.10 | 0.10 | 0.10 | 0.10 |
| oxalic acid[3] | — | 0.03 | — | — | — | — |

[1] Dry mix of Table VI with 325 mesh silica.
[2] Dry mix of Table VI with 325 mesh silica, epoxy resin omitted.
[3] Latex N is an acrylic copolymer latex with N-methylolacrylamide crosslinking functionality; oxalic acid is the crosslinking agent.

TABLE XV

| | Example | | | | | |
|---|---|---|---|---|---|---|
| | 39 | Comp. 11 | 40 | Comp. 12 | 41 | Comp. 13 |
| Filler | Silic325 | Silic325 | Silic325 | Silic325 | Silic325 | Silic325 |
| Latex | N | N | Acrnl8D | Acrnl8D | Acrnl627 | Acrnl627 |
| Silane | Z-6020 | Z-6020 | Z-6020 | Z-6020 | Z-6020 | Z-6020 |
| SandVol | 59.7 | 57.0 | 60.0 | 57.4 | 59.6 | 56.9 |
| FillVol | 14.1 | 13.4 | 14.2 | 13.5 | 14.1 | 13.4 |
| OrgVol | 14.8 | 14.2 | 14.9 | 14.3 | 14.8 | 14.2 |
| WsterVol | 11.4 | 15.4 | 10.9 | 14.8 | 11.5 | 15.5 |
| LatexPct | 70.1 | 99.3 | 70.1 | 99.3 | 70.1 | 99.3 |
| EpoxyPct | 22.4 | 0.0 | 22.4 | 0.0 | 22.4 | 0.0 |
| AminePct | 6.8 | 0.0 | 6.0 | 0.0 | 6.8 | 0.0 |
| SilanPct | 0.7 | 0.7 | 0.7 | 0.7 | 0.7 | 0.7 |
| Trowel | DryStick | VGSoupy | GoodDry | Excellnt | DrySlsti | Excellnt |
| Watr1Day | 0.43 | 1.92 | 0.30 | 2.39 | 0.56 | 2.46 |
| Watr7Day | 0.86 | 3.32 | 0.60 | 3.60 | 1.27 | 3.29 |
| DryCompr | 10500 | 7910 | 9090 | 3640 | 6060 | 2460 |
| WetCompr | 6870 | 2540 | 7270 | 831 | 4800 | 846 |

EXAMPLES 42–44

The preparative process of Example 1 was repeated using the components and the proportions shown in Table XVI. The effect of omitting the amine curing agent and employing a reduced level of amine curing agent and epoxy resin on the properties of cured coating compositions are reported in Table XVII. The results indicate that reducing the level of epoxy resin and amine curing agent may give poorer water resistance.

TABLE XVI

| | Example | | | |
|---|---|---|---|---|
| | 42 | 43 | 44 | Comp. 14 |
| Dry mix[1] | 188.68 | — | — | — |
| Dry mix[2] | — | 185.40 | 185.40 | 185.40 |
| Latex O (60.5%)[3] | 16.99 | 20.53 | 16.99 | 22.98 |
| Nopco NXZ | 0.13 | 0.13 | 0.13 | 0.13 |
| Jeffamine D-230 | 1.00 | 0.50 | — | — |
| Z-6020 silane | 0.10 | 0.10 | — | 0.10 |
| water | 2.00 | — | — | — |
| Genepoxy 370H55 (55%)[4] | — | 2.98 | 0.87 | 1.18 |
| Dabco[5] | — | — | 0.02 | 0.03 |

[1]Dry mix of Table VI with 325 mesh silica.
[2]Dry mix of Table VI with 325 mesh silica, epoxy resin omitted.
[3]Latex O is an acrylic copolymer latex with monomer composition 50.9 methyl methacrylate/47.3 butyl acrylate/1.8 acrylic acid
[4]Genepoxy 370H55 is an emulsified Epon 828 epoxy resin available from Daubert Chemical Co., Oak Brook, Illinois.
[5]Dabco is a triethylene diamine, available from Air Products and Chemicals, Inc., Allentown, PA.

TABLE XVII

| | Example | | | |
|---|---|---|---|---|
| | 42 | 43 | 44 | Comp. 14 |
| Filler | Silic325 | Silic325 | Silic325 | Duramite |
| Latex | O | O | O | O |
| Silane | Z-6020 | Z-6020 | Z-6020 | None |
| SandVol | 60.5 | 61.0 | 59.1 | 64.0 |
| FillVol | 14.3 | 14.4 | 14.0 | 15.1 |
| OrgVol | 15.1 | 15.2 | 14.8 | 11.8 |
| WaterVol | 10.1 | 9.4 | 12.1 | 9.1 |
| LatexPct | 84.7 | 70.1 | 94.7 | 95.4 |
| EpoxyPct | 11.2 | 22.4 | 4.4 | 4.4 |
| AminePct | 3.4 | 6.8 | 0.2 | 0.2 |
| SilanPct | 0.7 | 0.7 | 0.7 | 0.0 |
| Trowel | Soupy | GdSlSand | Soupy | GdSlSand |
| Watr1Day | 0.36 | 0.22 | 0.56 | 1.37 |
| Watr7Day | 0.80 | 0.54 | 1.25 | 2.53 |
| DryCompr | 10810 | 9850 | 8230 | 5520 |
| WetCompr | 7990 | 8190 | 5220 | 1920 |

EXAMPLE 45

The preparative process of Example 2 was repeated using Latex A of Table IX, except that various combinations of the epoxy, amine and silane were omitted, and cure of the coating compositions was carried out at 42° C. to ensure that the polymer latex would form a film in the absence of added epoxy resin and/or amine. The dry and wet compressive strength of the resulting cured coating compositions are given in Table XVIII. The results show that when the epoxy resin, or amine curing agent is omitted, the compressive strength decreases; but when they are included together, compressive strength increases. The silane improves strength and strength retention with all combinations.

TABLE XVIII

| Example | Epoxy | Amine | Silane | Compressive Strength (psi) | | |
|---|---|---|---|---|---|---|
| | | | | Dry | Wet | Retained (%) |
| Comp. 15 | — | — | — | 3443 | 434 | 12.6 |
| Comp. 16 | — | + | — | 2314 | 816 | 35.3 |
| Comp. 17 | + | — | — | 2148 | 542 | 25.2 |
| Comp. 18 | + | + | — | 4685 | 1991 | 42.5 |
| Comp. 19 | — | — | + | 5097 | 1658 | 32.5 |
| Comp. 20 | + | — | + | 3952 | 2620 | 66.3 |
| Comp. 21 | — | + | + | 1776 | 1136 | 64.0 |
| 45 | + | + | + | 7309 | 5348 | 73.2 |

EXAMPLES 46–65

The preparative process of Example 1 was repeated using the components and the proportions shown in Table VI (dry mix formulation "A"), except that sufficient polymer latex was employed in the coating formulation to provide 12.26 parts of polymer solids. The effects of employing various amino-functional and epoxy-functional silanes on the properties of cured coating compositions are reported in Table XIX (Examples 46–61 and Comparative Examples 22–25). These results show that substituting a non-functional silane (Comparative Examples 23 and 24) or omitting the silane (Comparative Example 22) reduces the compressive strength of the cured coating composition. The silanes of Examples 46–61 were of varying functionality and were used on an equal solids basis. The aminofunctional and epoxy-functional silanes employed provided cured coating compositions with similar compressive strengths. Similarly, amino-functional silanes having amino-alkyl groups with differing amino-alky chain length (e.g. Examples 46, 48 and 49) and either methoxy or ethoxy "head" groups (e.g. Examples 46, and 47) provided coating compositions with similar properties.

The effect of storing the wet component of a two component system is reported for Examples 56–66. the wet component of Examples 56–65 was heat aged at 60° C. for seven days prior to mixing with the dry component, in order to simulate long term ambient temperature storage of the components. Similarly, the wet component of Example 66 was heat aged at 50° C. for 33 days prior to mixing with the dry components. Comparison of the results shown in Table XIX for Examples 56–60 with Examples 51–55 (non-heat aged) and Example 61 with Example 46 (non-heat aged), respectively, shows that heat aging of the wet component mixture before blending with the dry component mixture reduces the compressive strength of the cured coating composition only slightly or not at all.

Examples 62–65 show that employing elevated levels of aminofunctional silane has little effect on the properties of the coating composition.

TABLE XIX A

| | Example | | | | |
|---|---|---|---|---|---|
| | Comp. 22 | 46 | 47 | 48 | 49 |
| Filler | Silic325 | Silic325 | Silic325 | Silic325 | Silic325 |
| Latex | A | A | A | A | A |
| Silane[1] | None | Z-6020 | A-1100 | A-1110 | A-1130 |
| SandVol | 57.6 | 57.5 | 57.5 | 57.5 | 57.5 |
| FillVol | 13.6 | 13.6 | 13.6 | 13.6 | 13.6 |
| OrgVol | 16.2 | 16.2 | 16.2 | 16.2 | 16.2 |
| WaterVol | 12.6 | 12.7 | 12.7 | 12.7 | 12.7 |
| LatexPct | 74.1 | 73.7 | 73.7 | 73.7 | 73.7 |
| EpoxyPct | 19.5 | 19.7 | 19.7 | 19.7 | 19.7 |
| AminePct | 6.1 | 6.0 | 6.0 | 6.0 | 6.0 |
| SilanPct | 0.0 | 0.6 | 0.6 | 0.6 | 0.6 |
| Trowel | Excellnt | Excellnt | Excellnt | Excellnt | Excellnt |
| Watr1Day | 1.01 | 1.72 | 1.21 | 0.90 | 1.12 |
| Watr7Day | 1.71 | 2.13 | 1.76 | 1.46 | 1.76 |
| DryCompr | 7910 | 10600 | 10630 | 11600 | 11400 |
| WetCompr | 4000 | 7450 | 784 | 863 | 8900 |

[1]Z-6020 = N-(2-animoethyl)-3-aminopropyl trimethoxysilane, Dow Corning Co., Midland, MI.
Z-6040 = glycidoxypropyl trimethoxysilane, Dow Corning.
A-1100 = 3-aminopropyl triethoxysilane, Union Carbide Corp., Danbury, CT.
A-1110 = 3-aminopropyl trimethoxysilane, Union Carbide.
A-1130 = diethylenetriaminepropyl trimethoxysilane, Union Carbide.
M9100 = methyl trimethoxysilane, Petrarch Systems (Huls), Bristol, PA.
D5605 = dimethyl diethoxysilane, Petrarch Systems.

TABLE XIX B

| | Example | | | | |
|---|---|---|---|---|---|
| | 50 | Comp. 23 | Comp. 24 | Comp. 25 | 51 |
| Filler | Silic325 | Silic325 | Silic325 | Silic325 | Silic325 |
| Latex | A | A | A | L | L |
| Silane[1] | Z-6040 | M9100 | D5606 | None | Z-6020 |
| SandVol | 57.5 | 57.5 | 57.5 | 57.7 | 57.6 |
| FillVol | 13.6 | 13.6 | 13.6 | 13.6 | 13.6 |
| OrgVol | 16.2 | 16.2 | 16.2 | 16.2 | 16.3 |
| WaterVol | 12.7 | 12.7 | 12.7 | 12.5 | 12.7 |
| LatexPct | 73.7 | 73.7 | 73.7 | 74.1 | 73.7 |
| EpoxyPct | 19.7 | 19.7 | 19.7 | 19.8 | 19.7 |
| AminePct | 6.0 | 6.0 | 6.0 | 6.1 | 6.0 |
| SilanPct | 0.6 | 0.6 | 0.6 | 0.0 | 0.6 |
| Trowel | Excellnt | Excellnt | Excellnt | Excellnt | Excellnt |
| Watr1Day | 1.11 | 0.89 | 0.89 | 0.70 | 0.35 |
| Watr7Day | 1.79 | 1.59 | 1.66 | 1.50 | 0.66 |
| DryCompr | 10000 | 8290 | 7850 | 6910 | 9280 |
| WetCompr | 8470 | 6520 | 6060 | 4080 | 7500 |

TABLE XIX C

| Example | 52 | 53 | 54 | 55 |
|---|---|---|---|---|
| Filler | Silic325 | Silic325 | Silic325 | Silic325 |
| Latex | L | L | L | L |
| Silane[1] | A-1100 | A-1110 | A-1130 | Z-6040 |
| SandVol | 57.6 | 57.6 | 57.6 | 57.6 |
| FillVol | 13.6 | 13.6 | 13.6 | 13.6 |
| OrgVol | 16.3 | 16.3 | 16.3 | 16.3 |
| WaterVol | 12.7 | 12.7 | 12.7 | 12.7 |
| LatexPct | 73.7 | 73.7 | 73.7 | 73.7 |
| EpoxyPct | 19.7 | 19.7 | 19.7 | 19.7 |
| AminePct | 6.0 | 6.0 | 6.0 | 6.0 |
| SilanPct | 0.6 | 0.6 | 0.6 | 0.6 |
| Trowel | Excellnt | Excellnt | Excellnt | Excellnt |
| Watr1Day | 0.68 | 0.67 | 0.63 | 0.83 |
| Watr7Day | 1.28 | 1.29 | 1.14 | 1.43 |
| DryCompr | 8680 | 8820 | 8620 | 8380 |
| WetCompr | 6230 | 7210 | 6940 | 7050 |

TABLE XIX D

| Example | 56 | 57 | 58 | 59 | 60 |
|---|---|---|---|---|---|
| Filler | Silic325 | Silic325 | Silic325 | Silic325 | Silic325 |
| Latex | L | L | L | L | L |
| Silane[1] | Z-6020 | A-1100 | A-1110 | A-1130 | Z-6040 |
| SandVol | 57.6 | 57.6 | 57.6 | 57.6 | 57.6 |
| FillVol | 13.6 | 13.6 | 13.6 | 13.6 | 13.6 |
| OrgVol | 16.3 | 16.3 | 16.3 | 16.3 | 16.3 |
| WaterVol | 12.7 | 12.7 | 12.7 | 12.7 | 12.7 |
| LatexPct | 73.7 | 73.7 | 73.7 | 73.7 | 73.7 |
| EpoxyPct | 19.7 | 19.7 | 19.7 | 19.7 | 19.7 |
| AminePct | 6.0 | 6.0 | 6.0 | 6.0 | 6.0 |
| SilanPct | 0.6 | 0.6 | 0.6 | 0.6 | 0.6 |
| Trowel | Excellnt | Excellnt | Excellnt | Excellnt | Excellnt |
| Watr1Day | 0.47 | 0.46 | 0.39 | 0.45 | 0.47 |
| Watr7Day | 0.96 | 0.96 | 0.77 | 0.89 | 0.82 |
| DryCompr | 8260 | 7040 | 7380 | 6970 | 7460 |
| WetCompr | 6930 | 6270 | 6830 | 6190 | 6120 |

TABLE XIX E

| Example | 61 | 62 | 63 | 64 | 65 |
|---|---|---|---|---|---|
| Filler | Silic325 | Duramite | Duramite | Duramite | Duramite |
| Latex | L | A | A | A | A |
| Silane[1] | Z-6020 | Z-6020 | Z-6020 | Z-6020 | Z-6020 |
| SandVol | 57.5 | 60.0 | 59.8 | 59.5 | 59.8 |
| FillVol | 13.6 | 13.9 | 13.9 | 13.8 | 13.9 |
| OrgVol | 16.2 | 15.0 | 15.3 | 15.7 | 15.3 |
| WaterVol | 12.7 | 11.1 | 11.0 | 11.0 | 11.0 |
| LatexPct | 73.7 | 70.1 | 68.2 | 66.1 | 68.3 |
| EpoxyPct | 19.7 | 22.4 | 21.8 | 21.1 | 21.8 |
| AminePct | 6.0 | 6.8 | 6.6 | 6.4 | 3.3 |
| SilanPct | 0.6 | 0.7 | 3.4 | 6.4 | 6.6 |
| Trowel | Excellnt | Excellnt | Excellnt | Excellnt | Excellnt |
| Watr1Day | 0.48 | 1.38 | 1.38 | 1.48 | 1.16 |
| Watr7Day | 0.87 | 2.02 | 1.89 | 2.07 | 0.76 |
| DryCompr | 11000 | 8860 | 8940 | 8980 | 9000 |
| WetCompr | 9250 | 4660 | 5310 | 5080 | 5740 |

EXAMPLES 66–84

The preparative process of Example 1 was repeated using the components and the proportions shown in Table VI (dry mix formulation "A"), except that sufficient polymer latex was employed in the coating formulation to provide 12.26 parts of polymer solids, and the amount of epoxy resin used was calculated to provide epoxide equivalent to 3.28 g Epon 828. The effects of employing various amino-functional epoxy curing agents on the rate of development of dry compressive strength of coating compositions (i.e. "early strength") are reported in Table XX (Examples 66–74). The effects of varying the hardness of the polymeric latex on dry compressive strength development is given in Table XXI (Examples 75–80) for two different amine curing agents.

Early strength is an important property of coatings for Portland cement concrete, especially when such coatings are applied to industrial floors, as a production area may be put out of service for the time required for the floor coating or overlay to cure. The results reported in Tables XX and XXI respectively show that early strength development can be achieved using a number of different amine curing agents, and that early strength is increased by employing a polymer latex with a high glass transition temperature.

Table XXII reports the results of varying the amine curing agent on the flexural properties of cured coating composition. Flexural strength and modulus were twice as great for the coating composition cured using the Jeffamine D-230 curing agent (Example 82) than when trimethyl hexamethylene diamine was used (Example 81). Since the ultimate strains were approximately the same, it is possible that further curing of the TMD-cured example could provide higher strength.

Table XXIII shows the result of water loss measurements from curing coating compositions prepared using Jeffamine D-230 curing agent and TMD. Water was lost faster from the TMD-cured coating composition (Example 84).

TABLE XX

| Example | Amine | Early Compresssive Strength (psi)[1] | | | |
|---|---|---|---|---|---|
| | | 24 hr. | 48 hr. | 72 hr. | 168 hr. |
| 66 | Jeffamine D-230[2] (PPO Diamine) | 1570 | 5320 | 6060 | 9620 |
| 67 | Ancamine 2021 (modified aliphatic polyamine)[3] | 1940 | 4520 | 6470 | 7460 |
| 68 | Ancamine 1922 (modified aliphatic polyamine) | 2290 | 5330 | 7760 | 8990 |
| 69 | Ancamine 1732 (cycloaliphatic Mannich Base) | 2470 | 5410 | 6300 | 7720 |
| 70 | Ancamine 1955 (modified cycloaliphatic polyamine) | 2760 | 4160 | 4830 | 4880 |
| 71 | Epicure 874 (DETA)[4] | 2840 | 4710 | 5650 | 7230 |
| 72 | Stonclad GS amine[5] | 3050 | 4660 | 3570 | 5260 |
| 73 | isophorone diamine | 4030 | 6790 | 7100 | 6980 |
| 74 | trimethyl hexamethylene diamine (TMD)[6] | 4720 | 6480 | 7170 | 7150 |

[1] $\frac{1}{4}$ inch cubes.
[2] polypropylene oxide diamine (average molecular weight: approx. 230), Texaco Chemical Co., Bellaire, TX.
[3] Ancamine ® curing agents are available from Pacific Anchor Chemical Co., Los Angeles, CA or Air Products and Chemicals, Inc., Allentown, PA.
[4] Diethylene triamine; Epicure ® curing agents are available from Hi-Tek Polymers of Louisville, KY.
[5] Stonhard, Inc., Maple Shade, NJ.
[6] Mixture of 2,2,4- and 2,4,4- isomers, available from Nuodex Inc. (Huls), Piscataway, NJ.

TABLE XXI

| Example | Latex | Amine | Dry Compresssive Strength (psi)[1] Hours: | | | |
|---|---|---|---|---|---|---|
| | | | 24 | 48 | 72 | 168 |
| 75 | J | D-230[2] | 1150 | 3400 | 5470 | 1800 |
| 76 | L | D-230 | 1570 | 5320 | 6060 | 9620 |
| 77 | M | D-230 | 2970 | 6110 | 7490 | 10500 |
| 78 | J | TMD[3] | 3220 | 4760 | 4140 | 5530 |
| 79 | L | TMD | 4030 | 6790 | 6790 | 6980 |
| 80 | M | TMD | 5340 | 6230 | 6230 | 7000 |

[1] 0.63 cm cubes.
[2] Jeffamine ® D-230 curing agent.
[3] Trimethyl hexamethylene diamine.

TABLE XXII

| Example[1] | Amine | Flexural Strength $\times 10^{-6}$ (Pa) | Ultimate Strain $\times 10^3$ (%) | Flexural Modulus $\times 10^9$ (Pa) |
|---|---|---|---|---|
| 81 | D-230[2] | 2.14 ∓ 0.18 | 15 ∓ 2 | 7.16 ∓ 0.74 |
| 82 | TMD[3] | 1.09 ∓ 0.19 | 15 ∓ 7 | 3.42 ∓ 0.19 |

[1] Aged 30 days at room conditions before testing, not heat cured; latex L.
[2] 1.00 g of Jeffamine D-230 curing agent employed in formulation of Table VI.
[3] 0.69 g of TMD substituted for Jeffamine curing agent in formulation of Table VI

TABLE XXIII

| Example[1] | Amine | Percent Water Loss | | |
|---|---|---|---|---|
| | | 3 hr | 20 hr | 5 days |
| 83 | D-230 | 29 | 60 | 86 |
| 84 | TMD | 41 | 71 | 98 |

[1] Latex L.

EXAMPLES 85-86

The preparative process of Example 1 was repeated using the components and the proportions shown in Table XXIV, to prepare two cured coating compositions (Examples 85 and 86), and ultraviolet degradation resistance of these materials was compared with that of an epoxy-amine polymer concrete using a Q-U-V accelerated weathering tester to simulate exterior exposure. A small amount of red iron oxide pigment was included in the coating formulation to facilitate following the progress of degradation with a colorimeter. Samples were removed from the Q-U-V unit ar various times for color readings using the Hunter L, a, and b scales. Color was measured compared with a Hunterlab white standard as well as with a retained standard of unexposed coating composition. The results of the evaluation are reported in Table XXV, as the changes in a, b, and L (delta a, delta b, and delta L), as well as the the difference vector in color space, delta E.

Delta E for the epoxy-amine polymer concrete changed significantly in just 48 hours, evidence for extensive UV degradation (delta E=8.93). The coatings compositions of the present invention did not change appreciably in color until some time between 270 and 414 hours, and were therefore much more resistant to UV degradation. The faster color loss of the epoxy-amine polymer concrete can also be seen in the "a" (red) dimension, where delta a for the epoxy comparative example was −3.96 after 48 hours, while a delta a of this magnitude was not observed for the examples of the invention until some time between 270 and 414 hours. At long exposure times, delta E values were greater for the samples of the present invention than for the epoxy-amine polymer concrete, reflecting the greater inital color of the inventive examples, rather than greater degradation.

TABLE XXIV

| Example | Comp. | 85 | 86 |
|---|---|---|---|
| Stonhard GS gray sand[1] | 185.40 | — | — |
| Stonclad GS epoxy resin[1] | 22.34 | — | — |
| Stonclad GS amine[1] | 5.36 | — | — |
| Dry mix[2] | — | 188.68 | 188.68 |
| Latex A (49.6% solids) | — | 18.13 | 18.13 |
| Nopco NXZ | — | 0.13 | 0.13 |
| Jeffamine D-230 | — | 1.00 | 1.00 |
| Z-6020 silane | — | 0.09 | 0.09 |
| Mobay red iron oxide[3] | 0.42 | 0.42 | 0.42 |

[1] Stonhard, Inc. Maple Shade, NJ.
[2] Dry mix A of Table VI, calcium carbonate.
[3] Mobay Chemical Co., Pittsburgh, PA.

TABLE XXV

| Example | Wt % Acrylic in Organic | QUV Exposure (hours) | Color L | Color a | Color b | Color Change (Delta)[1] L | Color Change (Delta)[1] a | Color Change (Delta)[1] b | Color Change (Delta)[1] E |
|---|---|---|---|---|---|---|---|---|---|
| Comp. (epoxy) | 0.0 | 0 | 41.37 | 16.75 | 11.66 | — | — | — | — |
| | | 48 | 48.60 | 12.95 | 12.06 | 8.01 | −3.96 | 0.04 | 8.93 |
| | | 96 | 50.05 | 12.04 | 11.70 | 8.23 | −5.83 | −0.04 | 10.08 |
| | | 270 | 50.17 | 14.04 | 11.05 | 8.09 | −3.85 | −0.54 | 8.97 |
| | | 414 | 49.58 | 14.43 | 11.02 | 7.31 | −3.62 | −0.76 | 8.20 |
| | | 510 | 49.38 | 14.30 | 10.46 | 7.12 | −3.22 | −1.29 | 7.92 |
| 85 (3373A) | 67.3 | 0 | 39.22 | 24.14 | 17.35 | — | — | — | — |
| | | 48 | 38.79 | 22.53 | 17.20 | −0.98 | −0.95 | 0.51 | 1.46 |
| | | 96 | 39.20 | 22.47 | 16.75 | −0.34 | −1.11 | −0.23 | 1.18 |
| | | 270 | 42.58 | 21.25 | 16.07 | 3.12 | 12.03 | −1.07 | 3.87 |
| | | 414 | 54.16 | 17.53 | 13.98 | 14.06 | −6.63 | −3.34 | 15.90 |
| | | 510 | 59.96 | 15.80 | 12.98 | 20.22 | −8.49 | −4.95 | 22.49 |
| 86 (3373A) | 70.1 | 0 | 39.24 | 24.16 | 17.56 | — | — | — | — |
| | | 48 | 39.17 | 23.39 | 17.91 | −0.31 | −0.68 | 0.30 | 0.80 |
| | | 96 | 39.42 | 22.51 | 16.91 | 0.61 | −1.47 | −0.60 | 1.70 |
| | | 270 | 41.43 | 22.01 | 16.79 | 2.49 | −1.24 | −0.26 | 2.79 |
| | | 414 | 51.75 | 19.69 | 15.56 | 11.15 | −4.83 | −2.49 | 12.40 |
| | | 510 | 59.53 | 17.38 | 14.06 | 20.90 | −7.52 | −4.23 | 22.61 |

[1]The delta values do not correspond exactly with differences in L, a, and b as the the delta values were obtained by measuring versus unexposed retained samples

EXAMPLES 87–90

The preparative process of Example 1 was repeated using the same components as Example 1 except for addition of surfactant to prepare coating compositions having differing levels of nonionic surfactant. The effect of increasing the level of nonionic surfactant on early splitting strength is reported in Table XXVI for two different levels of total solids. These results show a low level of nonionic surfactant is preferred for early strength development.

TABLE XXVI

| Example[1] | 87 | 88 | 89 | 90 |
|---|---|---|---|---|
| Weight % water | 5.38 | 5.38 | 6.01 | 6.01 |
| Water/silica 325 | 0.32 | 0.32 | 0.36 | 0.36 |
| Wt. % surfactant on polymer latex solids[2] | None | 2.0 | None | 4.0 |
| 1 day strength[3] | 200 | 105 | 170 | 75 |
| 4 day strength | 595 | 625 | 515 | 565 |
| 14 day strength | 925 | 1110 | 920 | 1010 |

[1]Latex L, Jeffamine EDR-148 curing agent.
[2]Post-added Triton ® X-405 surfactant, Rohm and Haas Co., Philadelphia, PA.
[3]Splitting tensile strength, psi.

EXAMPLES 91–96

The preparative process of Example 2 was repeated with variation of the epoxy resin in the dry mix and Jeffamine D-230 added to the latex to maintain the weight ratio of epoxy/amine constant while varying the ratio of latex solids to epoxy and amine. The organic solids contents and water contents of the mixtures were held constant (Examples 91–95). Samples for compression testing were cured 2 weeks at either 25° C. or 42° C. and tested dry (Table XXVII) or after soaking in water for 24 hours (Table XXVIII). In Example 96 water was omitted.

TABLE XXVII

| Example | Latex Solids/ Epoxy + Amine | Dry Compressive Strengths (2 Weeks) Cure at 25° C. | Dry Compressive Strengths (2 Weeks) Cure at 42° C. |
|---|---|---|---|
| 91 | 0/100 | 996,940,932 | 2296,1984,1744 |
| 92 | 30/70 | 3936,4212,3632 | 3264,3752,3816 |
| 93 | 50/50 | 4720,5768,5072 | 4988,4864,4720 |
| 94 | 70/30 | 5348,5576,4756 | 5584,6380,6572 |
| 95 | 100/0 | 3744,3928,3240 | 4444,4604,4126 |

TABLE XXVII-continued

| Example | Latex Solids/ Epoxy + Amine | Dry Compressive Strengths (2 Weeks) Cure at 25° C. | Dry Compressive Strengths (2 Weeks) Cure at 42° C. |
|---|---|---|---|
| 96 | 0/100 (no water) | 3700,2344,3424 | 3240,4680,3868 |

TABLE XXVIII

| Example | Latex Solids/ Epoxy + Amine | Wet Compressive Strengths Cure at 25° C. | Wet Compressive Strengths Cure at 42° C. |
|---|---|---|---|
| 91 | 0/100 | 680,716,756 | 888,1300,1384 |
| 92 | 30/70 | 3064,2924,3056 | 2304,2298,2452 |
| 93 | 50/50 | 4620,4096,4772 | 4604,4520,4357 |
| 94 | 70/30 | 4756,4396,4276 | 4580,4548,4680 |
| 95 | 100/0 | 856,884,864 | 1392,1392,1476 |
| 96 | 0/100 (no water) | 2940,2420,2444 | 3776,3448,4904 |

EXAMPLE 97

A chemically resistant coating for application by spray or comb-rake rather than trowel was prepared using the preparative process of Example 1 with the following dry and wet mixes:

| Component | Parts by Weight |
|---|---|
| Dry mix: | |
| 45 mesh sand | 666 |
| 70 mesh sand | 333 |
| Smithco 325 mesh silica | 1000 |
| Epon 828 | 59 |
| Wet mix: | |
| acrylic latex of Example 1 | 360 |
| Jeffamine EDR-148 | 11 |
| 3-(2-aminoethyl)-aminopropyl trimethoxy silane | 1.7 |
| water | 98.6 |
| Nopco NXZ defoamer | 1 |

The dry and wet mixes are mixed together to form the chemically resistant coating composition and applied to a concrete surface by conventional spray coating equipment.

EXAMPLE 98

The preparative process of Example 1 was repeated with modification of the dry and wet mixes as follows:

| Component | Parts by Weight |
|---|---|
| Dry mix: | |
| MDC No. 2 sand | 1000 |
| 60 mesh sand | 500 |
| 120 mesh sand | 500 |
| Smithco 325 mesh silica | 200.6 |
| Epon 828 | 37.2 |
| Wet mix: | |
| acrylic latex of Example 1 | 222.8 |
| Jeffamine EDR-148 | 7.1 |
| 3-(2-aminoethyl)-aminopropyl trimethoxy silane | 1.1 |
| water | 17.0 |
| Nopco NXZ defoamer | 3.4 |

The dry and wet mixes are mixed together to form a coating composition which is applied to a concrete surface by conventional means. This coating composition was easier to trowel than the coating composition of Example 1 and showed improved resistance to plastic shrinkage cracking in large areas of variable thickness. As shown in Table XXIX, the coating composition of Example 98 showed good compressive strength, chemical resistance and abrasion resistance, comparable to that of Example 1 and a commercial epoxy polymer concrete control. Both the composition of Example 1 and that of Example 98 showed superior thermal shock resistance compared with the commercial epoxy polymer concrete control.

TABLE XXIX

| | Example 1 | Example 98 | Comp. Ex. 26[1] |
|---|---|---|---|
| Compressive Strength (psi) | | | |
| 1 day | 1137 | 769 | 4292 |
| 2 days | 4029 | 2896 | 6275 |
| 3 days | 5118 | 4206 | 5616 |
| 14 days | 6534 | 6016 | 7122 |
| 28 days | 7240 | 6662 | 8568 |
| Fraction of Compressive Strength Retained After 1 Day Soak | | | |
| 10% acetic acid | 0.45 | 0.65 | 0.84 |
| 10% citric acid | 0.69 | 0.76 | 0.98 |
| water | 0.75 | 0.83 | 1.09 |
| Skydrol | 0.48 | 0.63 | 0.98 |
| Abrasion Resistance[2] mass loss | 80 mg | 70 mg | 80 mg |
| Thermal Shock | Pass all 20 | Pass all 20 | Fail at 12 |

[1]Stonclad GS epoxy.
[2]CS-17 wheel, 1000 cycles, 100 grams wheel

EXAMPLE 99

The preparative process of Example 1 was repeated, and the pot life of the resulting coating composition was studied. Cylinders for measurement of splitting tensile strength were cast immediately after mixing and at 2, 4, 6, 8, and 24 hours. The wet mortar was held at ambient temperature in a closed container. Splitting tensile measurements were made after 2 days and 2 weeks of ambient cure, and the results are given in Table XXX.

TABLE XXX

| Interval between mixing and casting | Splitting Tensile Strength (psi) | |
|---|---|---|
| | 2 Day Cure | 2 Week Cure |
| None | 493 | 1182 |
| 2 hours | 525 | 1105 |
| 4 hours | 599 | 1143 |
| 6 hours | 569 | 1075 |
| 8 hours | 565 | 1144 |
| 24 hours | 757 | 1187 |

The unusually long pot life of Example 99 is of great practical value, and is very surprising, considering the good early strength.

EXAMPLES 100–102

The preparative process of Example 1 was repeated, with variation in type and level of silane, as shown in Table XXXI. Samples were cast for splitting tensile strength measurement, and the results are also reported in Table XXXI.

TABLE XXXI

| | Comp. Ex. 27 | Ex. 100 | Ex. 101 | Ex. 102 |
|---|---|---|---|---|
| Silane type[1] | None | A | B | B |
| Silane level[2] | 0 | 0.30 | 0.30 | 0.15 |
| Splitting Tensile Strength (psi) | | | | |
| 1 day cure | 66 | 192 | 190 | 107 |
| 2 day cure | 175 | 520 | 525 | 315 |
| 4 day cure | 330 | 755 | 640 | 485 |
| 7 day cure | 520 | 930 | 885 | 685 |
| 14 day cure | 715 | 970 | 960 | 865 |

[1]Silane A is 3-(2-aminoethyl)-aminopropyltrimethoxy silane; silane B is aminopropyltrimethoxy silane.
[2]Weight percent silane on fine filler (silica).

The strong effect of silane on the early strength observed for Examples 100–102 in comparison with the comparative example without the silane is very surprising, and of great utility.

Various modifications can be made in the details of the various embodiments of the compositions and processes of the present invention, all within the spirit and scope of the invention as defined by the appended claims.

We claim:

1. A coating composition for use in coating or overlaying Portland cement concrete or metal, the composition comprising:
    (a) a synthetic polymer latex;
    (b) an amine-functional epoxy curing agent, the epoxy curing agent being soluble or dispersible in water;
    (c) a silane selected from the class consisting of epoxy-functional silanes and amine-functional silanes;
    (d) a liquid epoxy resin; and
    (e) filler having a fine particle size.

2. A composition according to claim 1 wherein the synthetic polymer latex comprises a synthetic polymer selected from acrylic polymers, styrene/acrylic copolymers, styrene/butadiene copolymers, chlorinated vinyl polymers, and hydrophobic vinyl acetate copolymers.

3. A composition according to claim 2 wherein the glass transition temperature of the synthetic polymer is from about 0° C. to 30° C.

4. A composition according to claim 1 wherein the polymer latex includes less than about 2 percent by weight of polymer solids of nonionic emulsifier.

5. A composition according to claim 1 wherein the synthetic polymer latex provides from about 60 to 75 percent by weight of the total organic solids of the composition.

6. A composition according to claim 1 wherein the filler having a fine particle size is a silica.

7. A composition according to claim 6 wherein the fine particle size filler has a mean particle size of from about 2 to 50 microns.

8. A composition according to claim 7 wherein the mean particle size of the fine particle size silica is from about 2 to 20 microns.

9. A composition according to claim 8 wherein the mean particle size of the fine particle size silica is from about 4 to 6 microns.

10. A composition according to claim 1 additionally comprising coarse aggregate.

11. A composition according to claim 10 wherein the coarse aggregate is sand.

12. A composition according to claim 11 wherein the sand is a mixture of a first sand having particles with an average particle size of about 20 to 30 mesh and a second sand having an average particle size of about 70 mesh.

13. A composition according to claim 1 wherein the silane is an aminoalkyltrialkoxysilane.

14. A composition according to claim 1 wherein the silane is a glycidyloxyalkyltrialkoxysilane.

15. A composition according to claim 1 wherein the amine-functional epoxy curing agent is a diamine oligomer of ethylene glycol.

16. A composition according to claim 1 wherein the amine-functional epoxy curing agent is a diamine oligomer of propylene glycol.

17. A curable latex composition for use in preparing a composition for coating or overlaying Portland cement concrete, the curable latex composition comprising:
   (a) a synthetic polymer latex;
   (b) an amine-functional epoxy curing agent, the epoxy curing agent being soluble or dispersible in water; and
   (c) a silane selected from the class consisting of epoxy-functional silanes and amine-functional silanes.

18. A two-component composition for use in coating or overlaying Portland cement concrete, the composition comprising:
   (a) a first component including:
      (1) a synthetic polymer latex;
      (2) an amine-functional epoxy curing agent, the epoxy curing agent being soluble or dispersible in water; and
      (3) a silane selected from the class consisting of epoxy-functional silanes and amine-functional silanes; and
   (b) a second component including:
      (1) a liquid epoxy resin; and
      (2) filler having a fine particle size,
   the first component and second component being mixed to provide the coating composition.

19. A process for protecting a Portland cement concrete surface, the process comprising:
   (a) applying a fluid protective coating composition to the surface, the coating composition comprising:
      (1) a synthetic polymer latex;
      (2) an amine-functional epoxy curing agent, the epoxy curing agent being soluble or dispersible in water;
      (3) a silane selected from the class consisting of epoxy-functional silanes and amine-functional silanes;
      (4) a liquid epoxy resin; and
      (5) filler having a fine particle size; and
   (b) permitting the coating composition to cure to form a protective coating.

20. A composite comprising a Portland cement concrete substrate and a protective coating, where the protective coating is on a least a portion of the substrate and where the protective coating comprises:
   (a) a synthetic polymer latex;
   (b) an amine-functional epoxy curing agent, the epoxy curing agent being soluble or dispersible in water;
   (c) a silane selected from the class consisting of epoxy-functional silanes and amine-functional silanes;
   (d) a liquid epoxy resin; and
   (e) filler having a fine particle size.

* * * * *